United States Patent
Manolakos et al.

(10) Patent No.: US 11,641,264 B2
(45) Date of Patent: May 2, 2023

(54) POSITION ASSISTED CROSS-LINK INTERFERENCE MEASUREMENT

(71) Applicant: QUALCOMM Incorporated, San Diego, CA (US)

(72) Inventors: Alexandros Manolakos, Escondido, CA (US); Huilin Xu, San Diego, CA (US); Jay Kumar Sundararajan, San Diego, CA (US); Gokul Sridharan, Sunnyvale, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 16/992,666

(22) Filed: Aug. 13, 2020

(65) Prior Publication Data
US 2021/0050983 A1    Feb. 18, 2021

(30) Foreign Application Priority Data

Aug. 16, 2019   (GR) .............................. 20190100364

(51) Int. Cl.
*H04W 72/08*   (2009.01)
*H04W 24/10*   (2009.01)
*H04L 5/00*    (2006.01)

(52) U.S. Cl.
CPC .......... *H04L 5/0073* (2013.01); *H04L 5/0048* (2013.01); *H04W 24/10* (2013.01); *H04W 72/082* (2013.01)

(58) Field of Classification Search
CPC ... H04L 5/0048; H04L 5/0053; H04L 5/0073; H04L 5/0094; H04W 24/10; H04W 72/082; H04B 17/345
See application file for complete search history.

(56) References Cited

U.S. PATENT DOCUMENTS

2018/0323916 A1    11/2018 Yang et al.
2020/0389805 A1*   12/2020 Kim ..................... H04B 17/345

FOREIGN PATENT DOCUMENTS

WO    WO-2018128297 A1 *  7/2018 ........... H04B 17/345
WO    WO-2020164063 A1    8/2020
WO    WO-2020211933 A1 * 10/2020

OTHER PUBLICATIONS

CMCC: "Discussion on UE-to-UE Cross-Link Interference Management", R1-1710784, 3GPP TSG RAN WG1 NR Ad-Hoc#2, Qingdao, P.R. China Jun. 27-30, 2017, Jun. 30, 2017, Retrieved from the Internet: URL: http://www.3gpp.org/ftp/Meetings_3GPP_SYNC/RAN1/Docs/. [retrieved on Jun. 26, 2017] p. 1-p. 3, 3 Pages, Sections 2,3.

(Continued)

*Primary Examiner* — Hoon J Chung
(74) *Attorney, Agent, or Firm* — Holland & Hart LLP

(57) ABSTRACT

Methods, systems, and devices for wireless communications are described. The method includes receiving, from a first base station, a set of cross-link interference measurement configurations associated with location information, performing a cross-link interference measurement procedure on signals received based on the set of cross-link interference measurement configurations, or the location information, or a location of the first UE, or a combination thereof, and transmitting, to the first base station, a measurement value based on the performed cross-link interference measurement procedure.

30 Claims, 18 Drawing Sheets

(56) References Cited

OTHER PUBLICATIONS

International Search Report and Written Opinion—PCT/US2020/046302—ISA/EPO—dated Dec. 4, 2020.
LG Electronics: "Summary#3 of Issues on UE-UE CLI Measurements and Network Coordination Mechanism", 3GPP Draft, 3GPP TSG RAN WG1 Ad-Hoc Meeting 1901, R1-1901374, Summary#3 of Issues on UE-UE CLI Measurements and Network Coordination Mechanism, 3rd Generation Partnership Project (3GPP), Mobile Competence Centre, 650, Route Des Lucioles, vol. RAN WG1, No. Taipei, Taiwan, Jan. 21, 2019-Jan. 25, 2019, Jan. 24, 2019 (Jan. 24, 2019), XP051597017, 48 pages, Retrieved from the Internet: URL: http://www.3gpp.org/ftp/tsg%5Fran/WG1%5FRL1/TSGR1%5FAH/NR%5FAH%5F1901/Docs/R1%2D1901374%2Ezip. [retrieved on Jan. 24, 2019] p. 1-p. 43.

* cited by examiner

POSITION ASSISTED CROSS-LINK INTERFERENCE MEASUREMENT

CROSS REFERENCE

The present application for patent claims the benefit of Greece Provisional Patent Application No. 20190100364 by MANOLAKOS et al., entitled "POSITION ASSISTED CROSS-LINK INTERFERENCE MEASUREMENT," filed Aug. 16, 2019, assigned to the assignee hereof, and expressly incorporated by reference herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Neighboring cells in a multiple-access system using time division duplexing (TDD) may use different configurations for TDD communications. In some cases, the different TDD configurations may lead to overlap for transmissions in opposite directions. For example, an uplink transmission by a first UE may interfere with downlink reception at a second UE if the uplink transmission and downlink reception are scheduled for an overlapping time and frequency. Interference between UEs using different TDD configurations may be known as cross-link interference (CLI). Current techniques for managing CLI in a TDD system may result in inefficient use of communication resources.

SUMMARY

The described techniques relate to improved methods, systems, devices, and apparatuses that support position assisted cross-link interference (CLI) measurement. Generally, the described techniques provide for efficient techniques for a CLI measurement procedure that utilizes location information (e.g., position). In some cases, the described techniques include performing CLI measurements based on the location of a victim wireless device (e.g., a UE, base station, or cell that experiences the CLI) and the location of one or more aggressor wireless devices (e.g., a UE, base station, or cell that causes the CLI). In some cases, the described techniques include performing CLI measurements based on the location of the victim wireless device without the location of an aggressor wireless device. In some cases, the described techniques include performing CLI measurements based on the location of one or more aggressor wireless devices without the location of the victim wireless device. In some cases, the described techniques include performing CLI measurements based on no known location of an aggressor wireless device or victim wireless device.

A method of wireless communications at a first UE of a first cell is described. The method may include receiving, from a first base station, a set of cross-link interference measurement configurations associated with location information, performing a cross-link interference measurement procedure on signals received based on the set of cross-link interference measurement configurations, or the location information, or a location of the first UE, or a combination thereof, and transmitting, to the first base station, a measurement value based on the performed cross-link interference measurement procedure.

An apparatus for wireless communications at a first UE of a first cell is described. The apparatus may include a processor, memory coupled with the processor, and instructions stored in the memory. The instructions may be executable by the processor to cause the apparatus to receive, from a first base station, a set of cross-link interference measurement configurations associated with location information, perform a cross-link interference measurement procedure on signals received based on the set of cross-link interference measurement configurations, or the location information, or a location of the first UE, or a combination thereof, and transmit, to the first base station, a measurement value based on the performed cross-link interference measurement procedure.

Another apparatus for wireless communications at a first UE of a first cell is described. The apparatus may include means for receiving, from a first base station, a set of cross-link interference measurement configurations associated with location information, performing a cross-link interference measurement procedure on signals received based on the set of cross-link interference measurement configurations, or the location information, or a location of the first UE, or a combination thereof, and transmitting, to the first base station, a measurement value based on the performed cross-link interference measurement procedure.

A non-transitory computer-readable medium storing code for wireless communications at a first UE of a first cell is described. The code may include instructions executable by a processor to receive, from a first base station, a set of cross-link interference measurement configurations associated with location information, perform a cross-link interference measurement procedure on signals received based on the set of cross-link interference measurement configurations, or the location information, or a location of the first UE, or a combination thereof, and transmit, to the first base station, a measurement value based on the performed cross-link interference measurement procedure.

Some examples of the method, apparatuses, and non-transitory computer-readable medium described herein may further include operations, features, means, or instructions for transmitting, to the first base station, a request for the set of cross-link interference measurement configurations and the location information, where the set of cross-link interference measurement configurations may be received at least in part in response to the transmitted request.

Some examples of the method, apparatuses, and non-transitory computer-readable medium described herein may further include operations, features, means, or instructions for determining a location of the first UE, where the location information includes the location of the first UE, and transmitting, to the first base station, the determined location of the first UE, where the set of cross-link interference measurement configurations may be configured based on the determined location of the first UE transmitted to the first base station.

Some examples of the method, apparatuses, and non-transitory computer-readable medium described herein may further include operations, features, means, or instructions for performing the cross-link interference measurement procedure may be based on the location of the first UE.

Some examples of the method, apparatuses, and non-transitory computer-readable medium described herein may further include operations, features, means, or instructions for performing the cross-link interference measurement procedure may be based on the first UE removing at least one location of the second cell from the location information.

In some examples of the method, apparatuses, and non-transitory computer-readable medium described herein, performing the cross-link interference measurement procedure further may include operations, features, means, or instructions for selecting a first location of the location information for cross-link interference measurement, performing, based on a location of the first UE, the cross-link interference measurement procedure on a first cross-link interference reference signal using a cross-link interference measurement configuration associated with the first location by assuming that a transmission point of the first cross-link interference reference signal may be at the first location, and bypassing performing, based on a location of the first UE, the cross-link interference measurement procedure on a second cross-link interference reference signal using a cross-link interference measurement configuration associated with a second location of the location information by assuming that a transmission point of the second cross-link interference reference signal may be different than the first location.

In some examples of the method, apparatuses, and non-transitory computer-readable medium described herein, the measurement value includes a measurement value for the first location and omits a measurement value for the second location.

Some examples of the method, apparatuses, and non-transitory computer-readable medium described herein may further include operations, features, means, or instructions for receiving an indication of the first location from the first base station or a UE of the second cell.

In some examples of the method, apparatuses, and non-transitory computer-readable medium described herein, the location corresponds to a geographic region, and performing the cross-link interference measurement procedure may include operations, features, means, or instructions for performing the cross-link interference measurement procedure on one or more UEs associated with the geographic region.

Some examples of the method, apparatuses, and non-transitory computer-readable medium described herein may further include operations, features, means, or instructions for receiving a cross-link interference resource configuration from at least one UE of the one or more UEs in the geographic region, where the cross-link interference measurement procedure may be performed on the at least one UE based on the received cross-link interference resource configuration.

In some examples of the method, apparatuses, and non-transitory computer-readable medium described herein, receiving the set of cross-link interference measurement configurations and the location information may include operations, features, means, or instructions for receiving radio resource control signaling that indicates the set of cross-link interference measurement configurations and the location information.

In some examples of the method, apparatuses, and non-transitory computer-readable medium described herein, the cross-link interference resource configuration of the second cell includes a sounding reference signal associated with at least one UE of the second cell, or an uplink configuration associated with at least one UE of the second cell, or a downlink configuration associated with at least one UE of the second cell, or uplink symbols associated with at least one UE of the second cell, or downlink symbols associated with at least one UE of the second cell, or a slot format associated with at least one UE of the second cell, or a combination thereof.

In some examples of the method, apparatuses, and non-transitory computer-readable medium described herein, the set of cross-link interference measurement configurations include an indication to measure a received signal strength, or a received power of a sounding reference signal, or a combination thereof, for at least one UE of the second cell.

In some examples of the method, apparatuses, and non-transitory computer-readable medium described herein, performing the cross-link interference measurement procedure further may include operations, features, means, or instructions for assuming that a location from the location information corresponds to a physical location transmitting a corresponding reference signal.

In some examples of the method, apparatuses, and non-transitory computer-readable medium described herein, the location information includes a location of a second base station of the second cell, or a physical location of a UE from the second cell, or an estimated location of a UE from the second cell, or a combination thereof.

A method of wireless communications at a first base station of a first cell is described. The method may include receiving, from a second base station of a second cell, a set of cross-link interference resource configurations of one or more user equipments (UEs) of the second cell and location information, determining, based on the set of cross-link interference resource configurations, a cross-link interference measurement configuration for a first UE of the first cell, and transmitting, to the first UE, an indication of the determined cross-link interference measurement configuration and the location information.

An apparatus for wireless communications at a first base station of a first cell is described. The apparatus may include a processor, memory coupled with the processor, and instructions stored in the memory. The instructions may be executable by the processor to cause the apparatus to receive, from a second base station of a second cell, a set of cross-link interference resource configurations of one or more user equipments (UEs) of the second cell and location information, determine, based on the set of cross-link interference resource configurations, a cross-link interference measurement configuration for a first UE of the first cell, and transmit, to the first UE, an indication of the determined cross-link interference measurement configuration and the location information.

Another apparatus for wireless communications at a first base station of a first cell is described. The apparatus may include means for receiving, from a second base station of a second cell, a set of cross-link interference resource configurations of one or more user equipments (UEs) of the second cell and location information, determining, based on the set of cross-link interference resource configurations, a cross-link interference measurement configuration for a first UE of the first cell, and transmitting, to the first UE, an indication of the determined cross-link interference measurement configuration and the location information.

A non-transitory computer-readable medium storing code for wireless communications at a first base station of a first cell is described. The code may include instructions executable by a processor to receive, from a second base station of a second cell, a set of cross-link interference resource configurations of one or more user equipments (UEs) of the second cell and location information, determine, based on the set of cross-link interference resource configurations, a cross-link interference measurement configuration for a first UE of the first cell, and transmit, to the first UE, an indication of the determined cross-link interference measurement configuration and the location information.

Some examples of the method, apparatuses, and non-transitory computer-readable medium described herein may further include operations, features, means, or instructions for transmitting, to the second base station, a request for cross-link interference resource configuration of the one or more UEs.

In some examples of the method, apparatuses, and non-transitory computer-readable medium described herein, determining the cross-link interference measurement configuration may include operations, features, means, or instructions for determining the cross-link interference measurement configuration based on the location information, where the location information includes a location of the second base station, or a physical location of a UE from the second cell, or an estimated location of a UE from the second cell, or a combination thereof.

Some examples of the method, apparatuses, and non-transitory computer-readable medium described herein may further include operations, features, means, or instructions for determining location information for the first UE, where determining the cross-link interference measurement configuration may be based on the location information for the first UE.

Some examples of the method, apparatuses, and non-transitory computer-readable medium described herein may further include operations, features, means, or instructions for removing one or more cross-link interference resource configurations from the set of cross-link interference resource configurations, where determining the cross-link interference measurement configuration may be based on the set of cross-link interference resource configurations with the one or more cross-link interference resource configurations removed.

Some examples of the method, apparatuses, and non-transitory computer-readable medium described herein may further include operations, features, means, or instructions for removing a location from the location information, where the cross-link interference measurement configuration may be for measuring a received power of a sounding reference signal, or a received signal strength, or a combination thereof.

Some examples of the method, apparatuses, and non-transitory computer-readable medium described herein may further include operations, features, means, or instructions for receiving a measurement report from the first UE, and adjusting a communication link between the first base station and the first UE based on the received measurement report.

A method of wireless communications is described. The method may include receiving, from a first base station of a first cell and at a second base station of a second cell, a request for cross-link interference resource configuration of one or more user equipments (UEs) of the second cell, determining location information associated with the one or more UEs, and transmitting, to the first base station, a set of cross-link interference resource configurations of the one or more UEs and the determined location information.

An apparatus for wireless communications is described. The apparatus may include a processor, memory coupled with the processor, and instructions stored in the memory. The instructions may be executable by the processor to cause the apparatus to receive, from a first base station of a first cell and at a second base station of a second cell, a request for cross-link interference resource configuration of one or more user equipments (UEs) of the second cell, determine location information associated with the one or more UEs, and transmit, to the first base station, a set of cross-link interference resource configurations of the one or more UEs and the determined location information.

Another apparatus for wireless communications is described. The apparatus may include means for receiving, from a first base station of a first cell and at a second base station of a second cell, a request for cross-link interference resource configuration of one or more user equipments (UEs) of the second cell, determining location information associated with the one or more UEs, and transmitting, to the first base station, a set of cross-link interference resource configurations of the one or more UEs and the determined location information.

A non-transitory computer-readable medium storing code for wireless communications is described. The code may include instructions executable by a processor to receive, from a first base station of a first cell and at a second base station of a second cell, a request for cross-link interference resource configuration of one or more user equipments (UEs) of the second cell, determine location information associated with the one or more UEs, and transmit, to the first base station, a set of cross-link interference resource configurations of the one or more UEs and the determined location information.

Some examples of the method, apparatuses, and non-transitory computer-readable medium described herein may further include operations, features, means, or instructions for determining location information associated with at least one of the one or more UEs, and determining the set of cross-link interference resource configurations based on the determined location information associated with the at least one of the one or more UEs.

Some examples of the method, apparatuses, and non-transitory computer-readable medium described herein may further include operations, features, means, or instructions for determining location information associated with a first UE of the first cell, and determining the set of cross-link interference resource configurations based on the determined location information associated with the first UE.

In some examples of the method, apparatuses, and non-transitory computer-readable medium described herein, the determined location information includes a location of the second base station.

In some examples of the method, apparatuses, and non-transitory computer-readable medium described herein, the location of the second base station may be a proxy location for at least one UE of the first cell.

In some examples of the method, apparatuses, and non-transitory computer-readable medium described herein, transmitting the set of cross-link interference resource configurations and the determined location information may include operations, features, means, or instructions for transmitting the set of cross-link interference resource configurations and the determined location information via radio resource control signaling.

DETAILED DESCRIPTION

Figure 1:
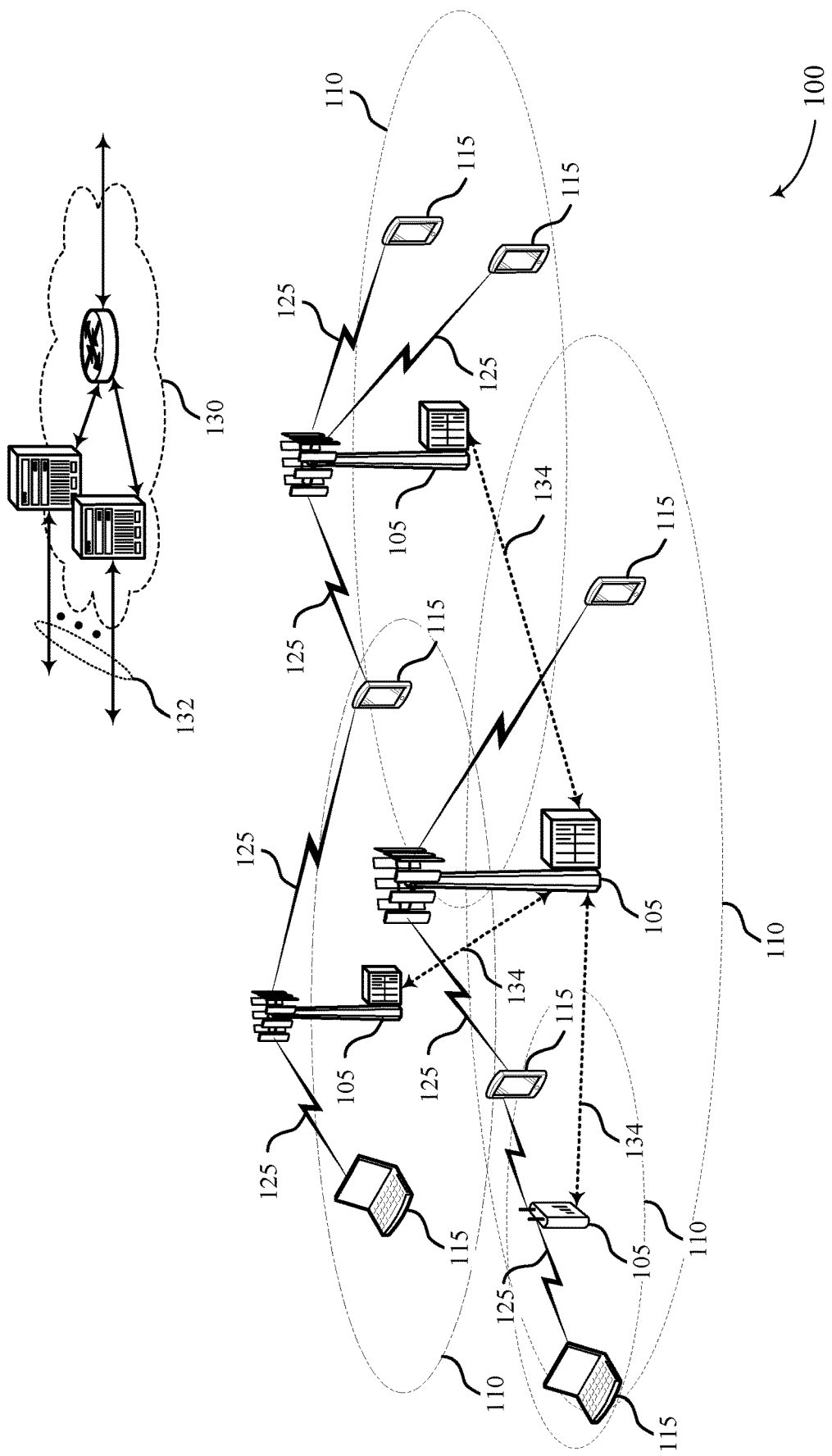
FIG. 1 illustrates an example of a system for wireless communications that supports position assisted cross-link interference measurement in accordance with aspects of the present disclosure.

The present techniques generally relate to position assisted cross-link interference (CLI) measurement. In some cases, a wireless device in a wireless cellular network may implement the present techniques to perform one or more CLI procedures.

In some cases, cells in a time division duplexing (TDD) system (e.g., TDD system with macro cells) may be configured with the same TDD uplink-downlink (UL-DL) configuration (e.g., the same slot formats). In some cases, conflict of symbol UL/DL types may occur between dynamically configured TDD UL-DL configurations of different cells (e.g., neighbor cells). For relatively small cells (e.g. cells with a cell radius of three hundred meters or less), TDD UL-DL configuration may dynamically change following a change of traffic pattern. In some cases, more UL symbols may be configured when it is determined that traffic is UL heavy. In some cases, more DL symbols may be configured when it is determined traffic is DL heavy. Due to the limited coverage of small cells, UEs in neighboring small cells may show a similar traffic pattern or a certain number of the UEs may dominate the traffic pattern.

To avoid problems with conventional systems, the present techniques may use location information to perform one or more CLI procedures. For example, a first wireless device of a network may use a location of the first wireless device or a location of a second wireless device of the network, or both, to perform one or more CLI procedures on the second wireless device. In one example, the first wireless device may be a first user equipment (UE) on an edge of a first cell (e.g., a macro cell) and the second wireless device may be a second UE on an edge of a second cell (e.g., a macro cell) adjacent to the edge of the first macro cell (e.g., different serving cells). In other examples, the second UE may be on an edge of a small cell (e.g., a micro, pico, or nano cell) adjacent to the edge of the first macro cell (e.g., same serving cell). In some cases, the first UE or a base station serving the first UE may determine that the second UE is likely to interfere with the first UE based on the location of the first UE or the location of the second UE, or based on the location of the first UE and the location of the second UE. In some cases, the first UE or the base station serving the first UE may determine that a third UE is unlikely to interfere with the first UE based on the location of the first UE or the location of the third UE, or based on the location of the first UE and the location of the third UE. In some cases, the first UE may perform a CLI measurement on the second UE and bypass performing a CLI measurement on the third UE. Accordingly, the present techniques may result in a reduction to signaling overhead when the first UE bypasses performing the CLI measurement on the third UE. In some cases, the reduced signaling overhead saves power by the first UE bypassing performing the CLI measurement of the third UE. In some cases, the reduced signaling overhead reduces CLI processing time when the first UE bypasses performing the CLI measurement on the third UE. Thus, the present techniques improve a user experience by reducing signaling overhead, saving power, and reducing processing time for CLI procedures.

Aspects of the disclosure are initially described in the context of a wireless communications system. Aspects of the disclosure are further illustrated by and described with reference to wireless communications subsystems, wireless spectrums, and process flows. Aspects of the disclosure are further illustrated by and described with reference to apparatus diagrams, system diagrams, and flowcharts that relate to position assisted cross-link interference measurement.

FIG. 1 illustrates an example of a wireless communications system 100 that supports position assisted cross-link interference measurement in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In one example, a first UE 115 may receive, from a first base station 105 of a first cell, a set of CLI measurement configurations associated with location information (e.g., location of the first UE 115, location of a second UE 115, location of a second base station 105 of a second cell, etc.). In some examples the set of CLI measurement configurations may include a location associated with each CLI measurement configuration. Such location may be used by a UE configured with the CLI measurement configuration as a geographic location assumed to be the transmission point for CLI reference signals when performing measurements according to that CLI measurement configuration. In some examples, the set of CLI measurement configurations may be provided to the UE via RRC signaling.

In some cases, the first UE 115 may perform a CLI measurement procedure on signals received based at least in part on the set of CLI measurement configurations or the location information, or both. In some cases, the first UE 115 may transmit, to the first base station 105, a measurement value based at least in part on the performed CLI measurement procedure.

In one example, the first base station 105 of a first cell may receive from a second base station of a second cell, location information and a set of CLI resource configurations of one or more UEs 115 of the second cell. In some cases, the first base station 105 may determine, based at least in part on the set of CLI resource configurations, a CLI measurement configuration (e.g., for the first UE 115). In some cases, the first base station 105 may transmit, to the first UE 115, an indication of the determined CLI measurement configuration and the location information.

In one example, the second base station 105 may receive, from first base station 105, a request for CLI resource configuration of one or more UEs 115 of the second cell. In some cases, the second base station 105 may determine location information associated with the one or more UEs 115. In some cases, the second base station 105 may transmit, to the first base station 105, a set of CLI resource configurations of the one or more UEs 115 and the determined location information.

Figure 2:
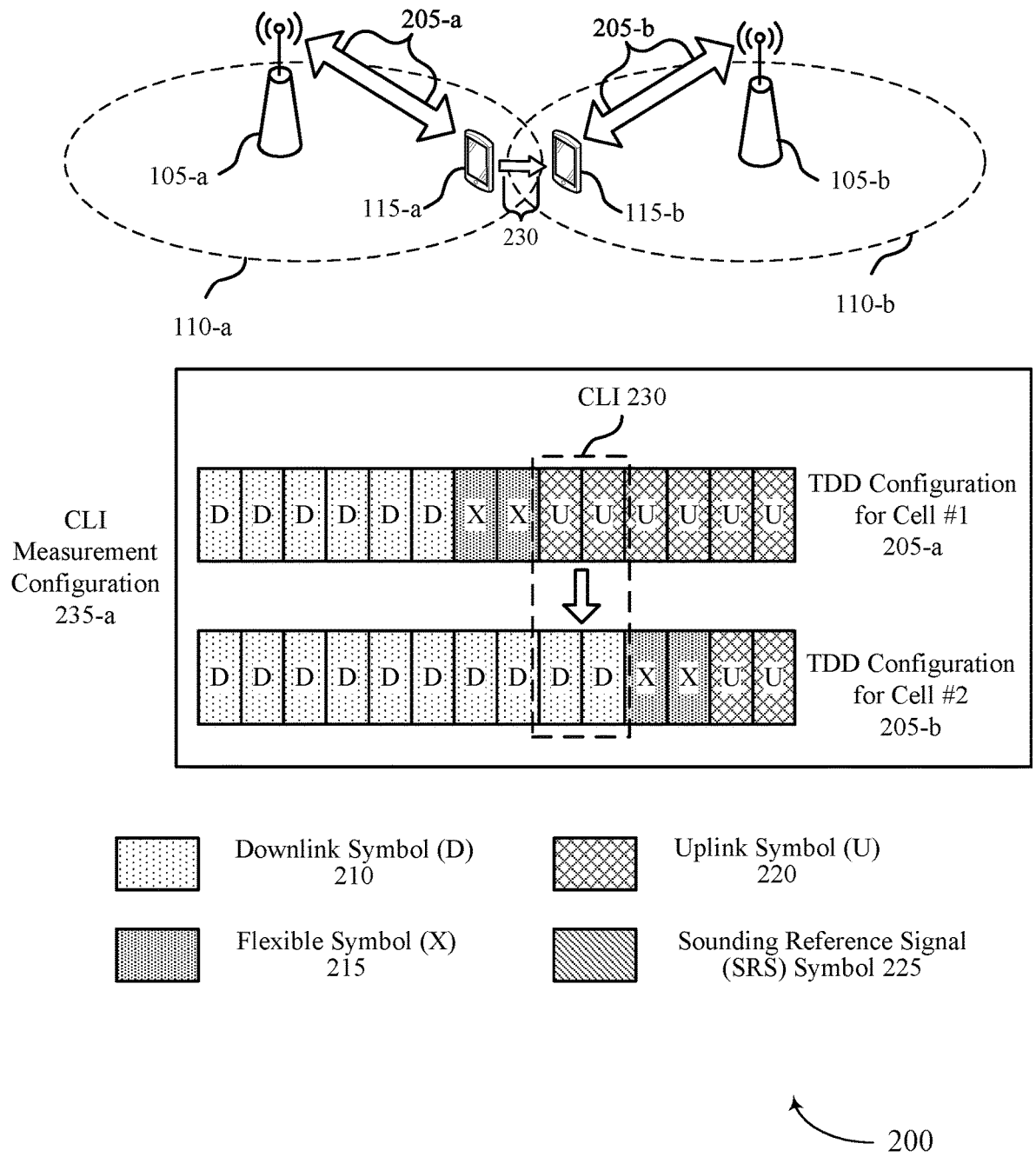
FIG. 2 illustrates an example of a wireless communications system that supports position assisted cross-link interference measurement in accordance with aspects of the present disclosure.

FIG. 2 illustrates an example of a wireless communications system 200 that supports position assisted cross-link interference measurement in accordance with aspects of the present disclosure. In some examples, wireless communications system 200 may implement aspects of wireless communication system 100. The wireless communications system 200 may include a UE 115-a and a UE 115-b, which may be examples of a UE 115 as described herein. The wireless communications system 200 may also include a base station 105-a and a base station 105-b, which may be examples of a base station 105 as described herein. Base station 105-a and base station 105-b may each be an example of a small cell (e.g., have a cell radius of a few hundred meters, less than 500 meters, less than 300 meters, etc.). The base stations 105 may each be associated with a cell which provides wireless communications with the base station 105 within a respective coverage area 110.

The wireless communications system 200 may employ TDD communications, where a wireless communications channel is used for both uplink transmissions and downlink transmissions. Each cell may configure a TDD configuration 205 for the cell. For example, the first cell of base station 105-a may use a first TDD configuration 205-a, and the second cell of base station 105-b may use a second TDD configuration 205-b. UEs 115 in these cells may communicate with the base station 105 providing the cell based on the corresponding TDD configuration 205. For example, a slot of a TDD configuration 205 may include symbol periods for downlink symbols 210, flexible symbols 215, uplink symbols 220, sounding reference signal (SRS) symbols 225, or any combination thereof. The base station 105 may transmit downlink in a downlink symbol 210, and the UE 115 may transmit an uplink transmission in an uplink symbol 220. Additionally, for SRS transmission and measurements, the UE 115 may transmit an SRS in an uplink transmission on an SRS symbol 225, and another UE 115 or a base station 105 may estimate the SRS with a corresponding configured resource in the downlink reception of a respective TDD configuration 205. Flexible symbols 215 may, in some cases, be used as guard periods between the uplink transmissions and downlink transmissions. A guard period may prevent inter-symbol interference or may provide time for a UE 115 to adjust radio frequency hardware. In some cases, a flexible symbol 215 may be dynamically reconfigured to either a downlink symbol 210 or an uplink symbol 220.

The base stations 105 may dynamically change the TDD configurations 205. In an example, the traffic in the first cell may shift toward being more uplink-heavy, so the first TDD configuration 205-a of the first cell may change to using a slot configuration which has more uplink symbol periods. In some cases, a TDD configuration 205 may be dynamically indicated to UEs in the cell by an SFI in downlink control information (DCI). The DCI conveying the SFI may be transmitted in one of the first few downlink symbols 210 of the slot. Additionally, or alternatively, the TDD configuration 205 may be semi-statically configured (e.g., included in an RRC configuration) by higher layer signaling, such as RRC signaling.

In some cases, different TDD configurations 205 used by neighboring cells may lead to conflicting transmission directions for some symbol periods of a slot. For example, the 9th and 10th symbol periods of the slot shown may have conflicting directions for the first TDD configuration 205-a and the second TDD configuration 205-b. TDD configuration 205-a may have uplink symbols 220 configured when TDD configuration 205-b has downlink symbols 210 configured. Therefore, UE 115-a in the first cell may be configured to transmit an uplink transmission while UE 115-b in the second cell is configured to receive a downlink transmission. The first cell and the second cell may be neighboring cells, and UE 115-b and UE 115-a may be near each other at the edge of their respective cell. In some cases, the uplink transmission of UE 115-a may cause interference to reception of the downlink transmission at UE 115-b. This type of interference may be referred to UE-to-UE CLI, shown by a CLI 230 at the conflicting symbol periods. Generally, differing TDD configurations 205 may result in UE-to-UE CLI 230 when an uplink symbol of one cell collides with a downlink symbol of another nearby cell. CLI 230 may occur near or between cell edge UEs of nearby cells. The UE 115 transmitting the uplink signal (e.g., UE 115-a here) may be referred to as the aggressor UE 115, and the UE 115 which is receiving the affected downlink transmission (e.g., UE 115-b here) may be referred to as the victim UE 115.

For interference management (e.g., whether more or less interference is allowed), a strength of CLI 230 may be measured by the UEs 115 involved in CLI 230 (e.g., UE 115-a and UE 115-b). Interference management may be used to determine whether more interference may be tolerated by a victim UE. In some cases, RSRP and RSSI may be identified as the measurement metrics for CLI 230. RSRP may indicate the received reference signal power of a configured reference signal resource for measuring CLI 230.

For example, one of the UEs 115 may demodulate a reference signal, perform a channel estimation on the demodulated signal, and measure the RSRP based on the channel estimation. RSSI may indicate a total received power from all signals that a UE 115 receives (e.g., from adjacent channels, other cells, its own cell, etc.) and may be measured in certain OFDM symbols (e.g., the symbols where the CLI is present). In some cases, the RSRP and RSSI measurements may be performed on respective reference signals transmitted by the aggressor UE 115 (e.g., UE 115-a) for measuring CLI 230. For example, the aggressor UE 115 may transmit a first set of CLI reference signals (CLI-RSs) to enable a victim UE 115 (e.g., UE 115-b) to measure an RSRP on the CLI-RSs (e.g., CLI-RSs for RSRP) for determining the strength of CLI 230, a second set of CLI-RSs to enable the victim UE 115 to measure an RSSI on the CLI-RSs (e.g., CLI-RSs for RSSI) for determining the strength of CLI 230, or a combination thereof.

In some cases, the CLI-RSs may be existing reference signals that a victim UE 115 measures to determine different metrics about the CLI. For example, the CLI-RSs may include SRSs, channel state information reference signals (CSI-RSs), or similar uplink signals that an aggressor wireless device transmits during one or more corresponding downlink symbols at the victim UE 115. Accordingly, the victim UE 115 may measure a strength of the CLI based on one or more CLI-RSs received from the aggressor wireless device. Additionally or alternatively, the CLI-RSs may include dedicated reference signaling for measuring a strength of the CLI. For example, the aggressor wireless device may transmit one or more specific CLI-RSs to enable a corresponding strength measurement of the CLI at the victim UE 115. In some cases, the specific CLI-RSs may include reference signals to enable an RSSI measurement at the victim UE 115, an RSRP measurement at the victim UE 115, an SINR measurement at the victim UE 115, or a combination thereof.

The strength of CLI 230 may be measured in one or more ways. Victim UEs 115 (e.g., UE 115-b) may measure signals (e.g., CLI-RSs for RSRP or RSSI measurements) transmitted from the aggressor UEs 115 (e.g., UE 115-a). Additionally or alternatively, aggressor UEs 115 may measure signals transmitted from victim UEs 115. Due to a channel reciprocity of the TDD configurations and channel, the measurement made by the aggressor UEs 115 may reflect the aggressor-to-victim interference strength (e.g., the interference at the victim UEs 115 may be reciprocally determined from the measurement at the aggressor UE 115). In some cases, these measurements for the strength of CLI 230 may be performed at different levels. For example, the strength measurement of CLI 230 may be cell-specific (e.g., all UEs 115 in a cell transmit the signals for the measurement), group-specific (e.g., a subset of UEs 115 in a cell transmit the signals for the measurement), or UE-specific (e.g., one UE 115 in the cell transmits the signals for the measurement). These different levels of measurements for CLI 230 may provide different levels of granularity for determining CLI strength, tolerance, and impact.

Additionally, the strength measurements may be performed periodically (e.g., periodic actions) or aperiodically (e.g., based on a series of aperiodic actions). For example, the aggressor UEs 115 may transmit one or more CLI-RSs periodically (e.g., based on a higher-layer configuration from a serving cell, base station 105, etc.), and the victim UEs 115 may accordingly perform the measurements on the CLI-RSs (e.g., RSRP, RSSI, etc.) according to the periodic transmissions. Additionally or alternatively, the aggressor UEs 115 may transmit one or more CLI-RSs aperiodically (e.g., based on an indication from the victim UE 115 when a strong interference is detected), and the victim UEs 115 may accordingly perform the measurements on the CLI-RSs according to the aperiodic transmissions. In some cases, a serving cell may configure both the aggressor UEs 115 and the victim UEs 115 to transmit and measure the CLI-RSs, respectively, according to the periodicity or based on the aperiodic interference detections.

To enable a signal strength measurement (e.g., a measurement of RSSI or RSRP) of CLI 230 (e.g., a CLI measurement configuration 235) in the wireless communications system 200 between two UEs 115 (e.g., UE 115-a and UE 115-b), one UE 115 may transmit an uplink signal in an uplink symbol 220, where this symbol corresponds to a downlink symbol 210 at another UE 115. For example, as shown in a CLI measurement configuration 235-a, UE 115-a may transmit an uplink signal in the 9th and 10th symbol periods of the slot, while UE 115-b is configured to receive downlink signals in the same of 9th and 10th symbol periods of the slot. In some cases, a symbol may be configured as a flexible symbol 215, but converted to an uplink symbol 220 or downlink symbol 210 if transmission or reception, respectively, of a channel or signals is configured to a UE 115 in the flexible symbol 215.

Additionally or alternatively, UE 115-a may transmit specific uplink signals for UE 115-b to measure a strength of CLI 230. In some examples, a CLI measurement configuration may include an SRS transmission and measurement on one or more SRS symbols 225, where UE 115-a (e.g., an aggressor UE 115) may transmit an SRS in an uplink transmission and UE 115-b (e.g., a victim UE 115) may estimate the SRS with a configured resource in a downlink reception. Initially, UE 115-b (e.g., or any victim UE 115 in the victim or second cell of base station 105-b) may observe a strong interference (e.g., CLI 230) and report it to base station 105-b. The system (e.g., base station 105-a, base station 105-b, a serving cell, etc.) may then trigger a CLI measurement (e.g., via a CLI measurement configuration 235) among the victim and aggressor cells (e.g., and corresponding UEs 115). Accordingly, a potential aggressor cell (e.g., base station 105-a, UE 115-a, etc.) may transmit an SRS in two SRS symbols 225 of a slot configuration (e.g., the last two symbols of a TDD configuration 205-c for the first cell of base station 105-a). Subsequently, a victim cell UE 115 (e.g., UE 115-b, additional UEs 115 in the second cell of base station 105-b) may measure the SRS in the configured resource in the downlink reception (e.g., in the last two downlink symbols 210 of a TDD configuration 205-d for the second cell of base station 105-b). In some cases, the victim cell UE 115 may then report the information for the SRS measurement (e.g., an RSRP, RSSI, or others) to its serving base station 105 (e.g., base station 105-b, serving cell, etc.)

To ensure that the proper symbol types are present to enable the strength measurement of CLI 230 between the two UEs 115, a slot format for one or both UEs 115 may be explicitly configured to include the proper symbol types or uplink signaling may be configured to be transmitted in the appropriate symbols. For example, UE 115-a, UE 115-b, or both may receive additional TDD configurations different than the TDD configurations 205 shown in wireless communications system 200 (e.g., dynamic TDD configurations for data traffic) that change downlink symbols 210 to uplink symbols 220 or uplink symbols 220 to downlink symbols 210. Accordingly, UE 115-b may then measure the strength of CLI 230 on the changed symbols. Additionally or alternatively, the strength measurement of CLI 230 may rely on the TDD configurations 205 for each cell (e.g., TDD uplink-downlink configurations) for data traffic. For example, UE 115-*a* may transmit uplink signaling in the interfering symbols (e.g., uplink symbols 220 in the 9th and 10th symbol periods or SRS symbols 225 in the 13th and 14th symbol periods) of an uplink-downlink configuration for dynamic TDD traffic (e.g., TDD configuration 205-*a* or TDD configuration 205-*c*). UE 115-*b* (e.g., or additional other UEs 115 in other cells) may perform measurement of CLI 230 in the corresponding interfered symbols (e.g., downlink symbols 210 in the 9th and 10th symbol periods or downlink symbols 210 in the 13th and 14th symbol periods) of the uplink-downlink configuration for dynamic TDD traffic (e.g., TDD configuration 205-*b* or TDD configuration 205-*d*).

While it is shown in FIG. 2 that each UE 115-*a* and UE 115-*b* are connected to a first and second cell with corresponding base stations 105-*a* and 105-*b*, respectively, different scenarios may exist where uplink transmissions from UE 115-*a* may cause CLI on downlink transmissions received by UE 115-*b*. The various techniques described herein may also be applied for other UE to base station connection scenarios. For example, UE 115-*a* and UE 115-*b* may be connected to a first cell and a second cell, respectively, but both cells may be associated with (e.g., served by) a same base station 105. Additionally or alternatively, UE 115-*a* and UE 115-*b* may be connected to the same cell served by the same base station 105, but UE 115-*a* and UE 115-*b* may have different configurations (e.g., UE-specific TDD configurations 205) that result in the CLI among each other while being connected to the same cell (e.g., a macro-pico scenario).

As described herein, the network (e.g., base stations 105-*a* and 105-*b*, serving cells, etc.) may utilize a combination of signal strength and/or power (e.g., RSSI and/or RSRP) metrics for CLI detection and management in multiple steps (e.g., two or more steps). In some cases, transmission and measurement of CLI-RSs for a CLI measurement procedure may be split into more than one step such that transmitting a CLI-RS for measuring an RSSI or RSRP may occur in more than one step and the measurement of the RSSI or RSRP on the CLI-RSs may occur in more than one step as well. For example, an aggressor wireless device (e.g., an aggressor UE 115-*a*, an aggressor cell, a group of aggressor UEs 115, aggressor base station 105-*a*, etc.) may transmit a CLI-RS for an RSSI or RSRP in a first step of the CLI measurement procedure. Subsequently, a victim wireless device (e.g., victim UE 115-*b*, a victim cell, a victim base station 105-*b*, etc.) may measure the CLI-RS to determine an RSSI or RSRP for the strength of CLI 230 in the same first step of the CLI measurement procedure. A serving cell for the victim wireless device may then compare the RSSI or RSRP measurement against a threshold value, where the comparison may trigger a second step of the CLI measurement procedure. Accordingly, in the second step of the CLI measurement procedure, the aggressor wireless device may transmit a second CLI-RS for either an RSSI or RSRP measurement (e.g., the second CLI-RS is transmitted based on the comparison of the first measurement against the threshold value), and the victim wireless device may measure the second CLI-RS to determine an RSSI or RSRP for the strength of CLI 230. In some cases, the steps of the CLI measurement procedure (e.g., the CLI-RS transmissions and measurements) may occur periodically or via a series of aperiodic steps.

In some cases, rather than comparing the different RSSI and RSRP measurements against the threshold value to trigger the different steps of the CLI measurement procedure, a serving cell (e.g., base station 105) may use an event trigger to trigger one or more actions of the CLI measurement procedure. For example, events may be defined that trigger a corresponding action of the CLI measurement procedure, current events may trigger different actions, or a combination thereof. Accordingly, if a matching event is identified by the serving cell, the corresponding actions may be triggered by the serving cell. For example, a handover procedure (e.g., L3 event) may trigger the CLI measurement procedure or an action for the CLI measurement procedure. Additionally or alternatively, when an event indicates the serving cell becomes worse than a threshold value (e.g., an A2 event), one or more actions may be triggered. For example, if the serving cell meets this event, a CLI transmission and measurement may be triggered, or an RSSI measurement of the CLI may be transferred to an RSRP transmission and measurement, or a CLI management is performed more frequently, or a combination thereof. Additionally or alternatively, a different event may be defined for when an interference measurement (e.g., RSSI, RSRP, SINR, etc.) exceeds the threshold.

Figure 3:
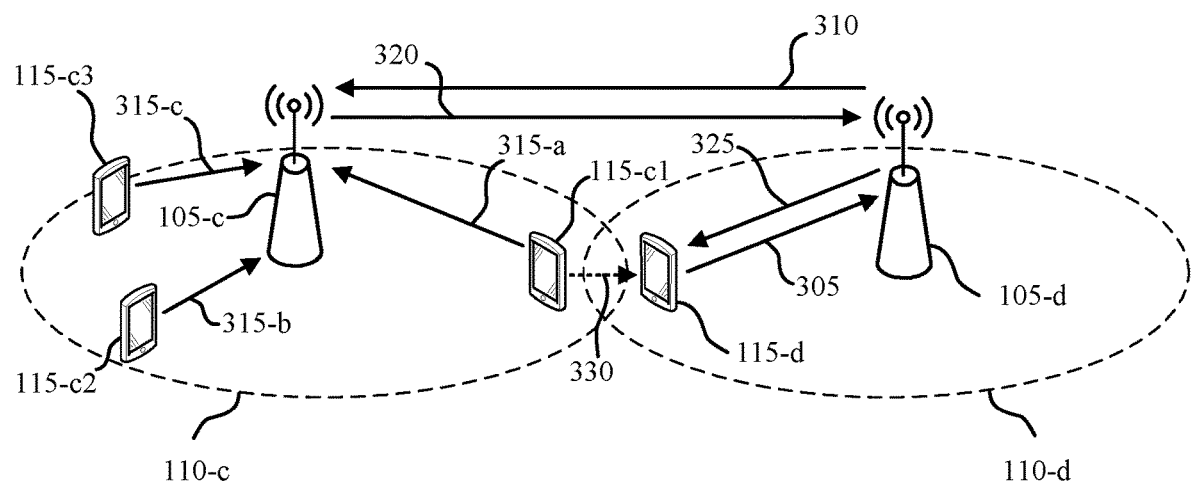
FIG. 3 illustrates an example of a wireless communications system that supports position assisted cross-link interference measurement in accordance with aspects of the present disclosure.

FIG. 3 illustrates an example of a wireless communications system 300 that supports position assisted cross-link interference measurement in accordance with aspects of the present disclosure. In some examples, wireless communications system 300 may implement aspects of a wireless communications system of FIG. 1 or 2. The wireless communications system 300 may include a UE 115-*c* and a UE 115-*d*, which may be examples of a UE 115 as described herein. The wireless communications system 300 may also include a base station 105-*c* and a base station 105-*d*, which may be examples of a base station 105 as described herein. Base station 105-*c* and base station 105-*d* may each be an example of a small cell (e.g., have a cell radius of a few hundred meters, less than 500 meters, less than 300 meters, etc.). The base stations 105 may each be associated with a cell which provides wireless communications with the base station 105 within a respective coverage area 110.

In some cases, wireless communications system 300 includes an illustrated example of when both an aggressor UE and a victim UE report their respective locations to a network. In one example, a victim UE may report its location to its serving base station (e.g., victim base station in a first cell), and an aggressor UE may report its location to its serving base station (e.g., aggressor base station in a second cell adjacent to the first cell).

As illustrated, wireless communications system 300 may include coverage area 110-*d* (e.g., a first cell) and coverage area 110-*c* (e.g., a second cell). As illustrated, the coverage areas 110 of wireless communications system 300 may include base station 105-*d* (e.g., a first base station of the first cell), base station 105-*c* (e.g., a second base station of the second cell), UE 115-*d* (e.g., a first UE of the first cell), UE 115-*c*1 (e.g., a second UE at a first location of the second cell), UE 115-*c*2 (e.g., a third UE at a second location of the second cell), and UE 115-*c*3 (e.g., a fourth UE at a third location of the second cell), which may be an example of a macro-macro scenario.

At 305, UE 115-*d* may report its location to its serving base station (e.g., base station 105-*d*). In some cases, UE 115-*d* may report its location to a location server associated with coverage area 110-*d*. In some cases, base station 105-*d* may determine the location of UE 115-*d* (e.g., via UE-assisted location determination). In some cases, UE 115-*d* may report its location in UE-based positioning.

At 310, base station 105-*d* may transmit to base station 105-*c* a location of UE 115-*d*. In some cases, base station 105-*d* may transmit to base station 105-*c* the location of UE 115-*d* and the CLI resource configuration of UE 115-*d*. In some cases, base station 105-*d* may report to base station 105-*c* the location of UE 115-*d* and receive as a response by base station 105-*c* a smaller set of CLI resource configurations (e.g., without the CLI resource configuration of UE 115-*c*2 or UE 115-*c*3, or both).

At 315 (e.g., 315-*a*, 315-*b*, 315-*c*), the UEs of coverage area 110-*c* (e.g., UE 115-*c*1, UE 115-*c*2, UE 115-*c*3) may report their respective locations to base station 105-*c*. In some cases, the UEs of coverage area 110-*c* may report their respective locations in UE-based positioning. In some cases, one or more UEs of coverage area 110-*c* may report their respective locations to a location server and the location server may forward the respective locations to base station 105-*c* or base station 105-*d*.

At 320, base station 105-*c* may transmit a set of CLI resource configurations of UEs from coverage area 110-*c* that may potentially interfere with UE 115-*d*. In some cases, base station 105-*c* may analyze the location of UE 115-*d* relative to the location of one or more UEs from coverage area 110-*c*, and may generate the set of CLI resource configurations based on this analysis. For example, base station 105-*c* may include the CLI resource configuration of UE 115-*c*1 in the set of CLI resource configurations, but not include the CLI resource configuration of UE 115-*c*2 or UE 115-*c*3, or both, in the set of CLI resource configurations. In some cases, based on at least a portion of the location information (e.g., location of UE 115-*d*, or location of UE 115-*c*1, or location of UE 115-*c*2, or location of UE 115-*c*3, or any combination thereof), base station 105-*d* may determine one or more UEs in coverage area 110-*c* that potentially interferes with UE 115-*d* based on the set of CLI resource configurations base station 105-*d* receives at 320.

At 325, base station 105-*d* may send UE 115-*d* a CLI measurement configuration (e.g., time and frequency resources on which to measure SRS-RSRP, RSSI). In some cases, the CLI measurement configuration may be derived from a subset of the CLI resource configurations that base station 105-*d* receives from base station 105-*c*. In some cases, base station 105-*d* may remove one or more CLI resource configurations and/or one or more locations from the location information (e.g., remove or ignore location of UE 115-*c*2 from the location information, or remove or ignore location of UE 115-*c*3 from the location information, or remove or ignore both) based on the CLI measurement configuration UE 115-*d* receives at 325.

At 330, UE 115-*d* may measure CLI from UE 115-*c*1 based on a transmission from UE 115-*c*1. In some cases, UE 115-*d* then reports a result of the measured CLI to base station 105-*d*. In some cases, UE 115-*d* may bypass measuring CLI from UE 115-*c*2 or from UE 115-*c*3, or both, based at least in part on the CLI measurement configuration UE 115-*d* receives from base station 105-*d* at 325. Accordingly, the result of the measured CLI may include measured CLI for UE 115-*c*1, but not include measured CLI for UE 115-*c*2 or UE 115-*c*3, or neither one.

Figure 4:
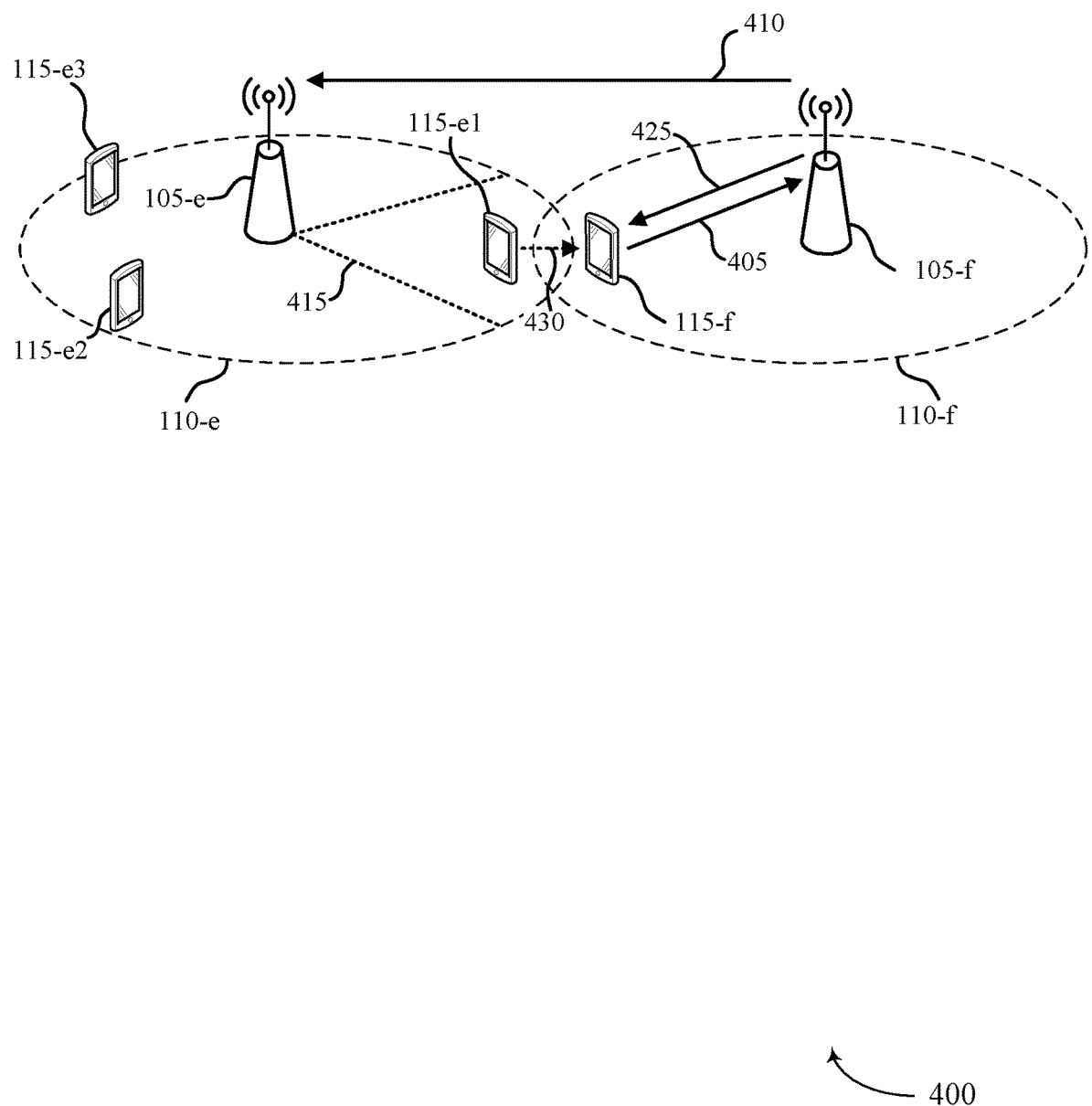
FIG. 4 illustrates an example of a wireless communications system that supports position assisted cross-link interference measurement in accordance with aspects of the present disclosure.

FIG. 4 illustrates an example of a wireless communications system 400 that supports position assisted cross-link interference measurement in accordance with aspects of the present disclosure. In some examples, wireless communications system 400 may implement aspects of a wireless communications system of FIGS. 1-3. The wireless communications system 400 may include a UE 115-*e* (e.g., 115-*e*1, 115-*e*2, 115-*e*3) and a UE 115-*f*, which may be examples of a UE 115 as described herein. The wireless communications system 400 may also include a base station 105-*e* and a base station 105-*f*, which may be examples of a base station 105 as described herein. Base station 105-*e* and base station 105-*f* may each be an example of a small cell (e.g., have a cell radius of a few hundred meters, less than 500 meters, less than 300 meters, etc.). The base stations 105 may each be associated with a cell which provides wireless communications with the base station 105 within a respective coverage area 110. In some cases, wireless communications system 400 may be an example of when a victim UE reports its location to a network, but an aggressor UE does not report its location to the network.

At 405, UE 115-*f* may report its location to its serving base station (e.g., base station 105-*f*). In some cases, UE 115-*f* may report its location to a location server associated with coverage area 110-*f* In some cases, base station 105-*f* may determine the location of UE 115-*f* (e.g., UE-assisted location determination). In some cases, UE 115-*f* may report its location in UE-based positioning.

At 410, base station 105-*f* may forward location information associated with UE 115-*f* to base station 105-*e* based at least in part on UE 115-*f* reporting its location to base station 105-*f* at 405. In some cases, base station 105-*f* may communicate the location information to base station 105-*e* using signaling on a backhaul link (e.g., via an X2, Xn, or other interface). In some cases, base station 105-*f* may communication the location information directly (e.g., directly between base station 105-*f* and base station 105-*e*) or indirectly (e.g., via a core network). In some cases, base station 105-*f* may forward location information associated with UE 115-*f* to a location server of coverage area 110-*f* or a location server of coverage 110-*e*, and the location server or respective location servers of each coverage area 110 may forward the location information to base station 105-*e*.

After receiving the location information associated with UE 115-*f*, base station 105-*e* may analyze the location information. In some cases, the analysis may include base station 105-*e* determining from the received location information a location of UE 115-*f*. In some cases, the analysis may include base station 105-*e* analyzing the location of UE 115-*f* in relation to the location of one or more UEs in coverage area 110-*e* (e.g., UE 115-*e*1, UE 115-*e*2, UE 115-*e*3, etc.). In some cases, the analysis may include base station 105-*e* determining the location of the one or more UEs in coverage area 110-*e* or determining whether at least one of the one or more UEs in coverage area 110-*e* is within a particular geographic region. Based at least in part on this analysis, base station 105-*e* may configure a CLI resource configuration for each UE in a particular geographic region of coverage area 110-*e*. For example, base station 105-*e* may configure a CLI resource configuration for each UE in a geographic region of coverage area 110-*e* that is relatively near coverage area 110-*f* or relatively near UE 115-*f* (e.g., region 415). In the illustrated example, base station 105-*e* may configure a CLI resource configuration for at least UE 115-*e*1 based at least in part on UE 115-*e*1 being in region 415. Although the illustrated example shows a single UE (UE 115-*e*1) inside region 415, it is understood that region 415 may include two or more UEs, and that base station 105-*e* may send the region-specific CLI resource configuration to each UE that base station 105-*e* determines is in region 415, including UE 115-*e*1. In some cases, base station 105-*e* may broadcast the region-specific CLI resource configuration to the UEs in region 415 (e.g., in a system information block message).

At 425, base station 105-*f* may transmit to UE 115-*f* a CLI measurement configuration (e.g., SRS-RSRP, RSSI, UL/DL configuration). In some cases, base station 105-*f* may generate the CLI measurement configuration based at least in part on the location of UE 115-*f*. In one example, base station 105-*e* may send to base station 105-*f* a nominal location of one or more sector areas of coverage area 110-*e* and CLI resource patterns associated with the one or more sector areas. Based on the nominal locations and location of UE 115-*f*, base station 105-*f* may select which sectors should be measured by UE 115-*f*. In this example, base station 105-*f* may configure the CLI measurement configuration to include the selected CLI resource configurations of the selected sectors.

In some cases, base station 105-*f* may generate a CLI measurement configuration for an individual UE of coverage area 110-*e* (e.g., not broadcasted in a SIB). For example, base station 105-*f* may generate a CLI measurement configuration for UE 115-*e*1, or UE 115-*e*2, or UE 115-*e*3, or any combination thereof. In this example, base station 105-*e* may send the individual CLI measurement configurations and base station 105-*f* may determine which individual CLI measurement configurations to include in the CLI measurement configuration.

At 430, UE 115-*f* may measure CLI for region 415 (e.g., for CLI reference signals from one or more UEs, including UE 115-*e*1) from which UE 115-*f* received the region-specific CLI resource configuration. In some cases, UE 115-*f* then reports a result of the measured CLI to base station 105-*f*.

Figure 5:
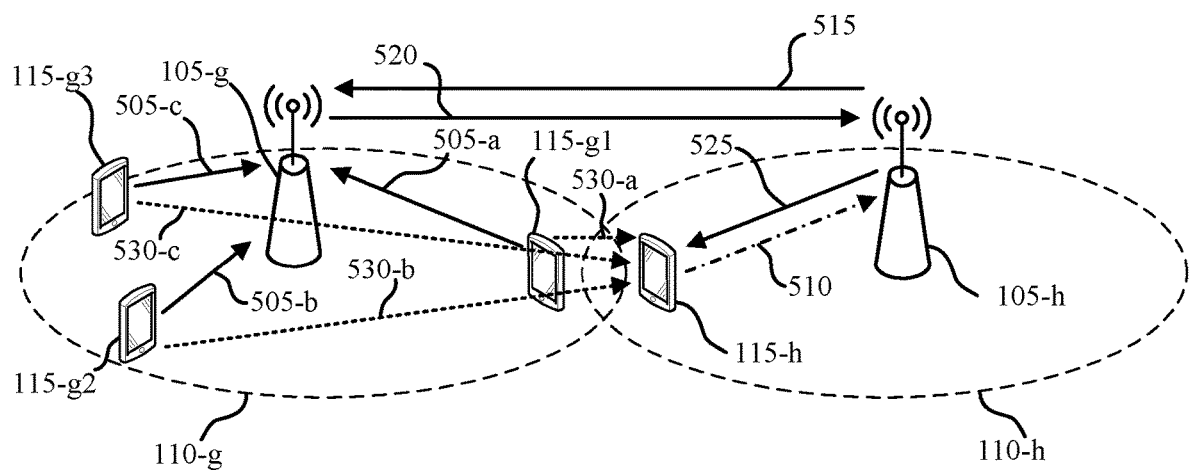
FIG. 5 illustrates an example of a wireless communications system that supports position assisted cross-link interference measurement in accordance with aspects of the present disclosure.

FIG. 5 illustrates an example of a wireless communications system 500 that supports position assisted cross-link interference measurement in accordance with aspects of the present disclosure. In some examples, wireless communications system 500 may implement aspects of a wireless communications system of FIGS. 1-4. The wireless communications system 500 may include a UE 115-*g* (e.g., 115-*g*1, 115-*g*2, 115-*g*3) and a UE 115-*h*, which may be examples of a UE 115 as described herein. The wireless communications system 500 may also include a base station 105-*g* and a base station 105-*h*, which may be examples of a base station 105 as described herein. Base station 105-*g* and base station 105-*h* may each be an example of a small cell (e.g., have a cell radius of a few hundred meters, less than 500 meters, less than 300 meters, etc.). The base stations 105 may each be associated with a cell which provides wireless communications with the base station 105 within a respective coverage area 110. In some cases, wireless communications system 500 may be an example of when an aggressor UE reports its location to a network, but a victim UE does not report its location to the network.

At 505, the UEs of coverage area 110-*g* (e.g., UE 115-*g*1, UE 115-*g*2, UE 115-*g*3) may report their respective location to base station 105-*g*. In some cases, the UEs of coverage area 110-*g* may report their respective location in UE-based positioning. In some cases, the UEs of coverage area 110-*g* may report their respective location to a location server of coverage area 110-*g* and the location server may forward the location information to base station 105-*g*. In some cases, base station 105-*g* may determine the location of the UEs of coverage area 110-*g* (e.g., via UE-assisted location determination).

At 510, UE 115-*h* may optionally send to base station 105-*h* a request to receive CLI resource configurations to measure. In some cases, UE 115-*h* may determine its location and then determine based on its location whether it is potentially impacted by CLI (e.g., UE 115-*h* determines that it is a cell edge UE in a macro-macro scenario). When UE 115-*h* determines based on its location that it is potentially impacted by CLI, UE 115-*h* may send to base station 105-*h* a request to receive CLI resource configurations to measure.

In some cases, UE 115-*h* may not send to base station 105-*h* a request to receive CLI resource configurations to measure. When UE 115-*h* does not send this request to base station 105-*h*, base station 105-*h* may transmit a CLI measurement configuration to UE 115-*h* whether or not it is determined by at least one base station or at least one UE of either coverage area 110 that UE 115-*h* may be impacted by CLI.

At 515, base station 105-*h* may transmit to base station 105-*g* a request for CLI resource configurations of UEs of coverage area 110-*g* (e.g., UE 115-*g*1, UE 115-*g*2, UE 115-*g*3). In some cases, base station 105-*h* may indicate in the request a location of UE 115-*h* when base station 105-*h* determines or receives the location of UE 115-*h*. Alternatively, base station 105-*h* may indicate in the request that the location of UE 115-*h* is not known when base station 105-*h* has not determined or has not received the location of UE 115-*h*. In some cases, base station 105-*h* may indicate in the request a location of base station 105-*h* (e.g., as a proxy location of UE 115-*h*).

At 520, base station 105-*g* may transmit a set of CLI resource configurations to base station 105-*h* (e.g., via RRC signaling). In some cases, the set of CLI resource configurations may include a first CLI resource configuration for UE 115-*g*1, or a second CLI resource configuration for UE 115-*g*2, or a third CLI resource configuration for UE 115-*g*3, or any combination thereof. In some cases, one or more CLI resources configurations in the set of CLI resource configurations may include an associated location. For example, the first CLI resource configuration for UE 115-*g*1 may include a first location for UE 115-*g*1, or the second CLI resource configuration for UE 115-*g*2 may include a second location for UE 115-*g*2, or the third CLI resource configuration for UE 115-*g*3 may include a third location for UE 115-*g*3, or any combination thereof. In some cases, at least one CLI resource configuration in the set of CLI resource configurations may include a location of base station 105-*g* as a proxy location for at least one location of a UE in coverage area 110-*g*. In some cases, at least one CLI resource configuration in the set of CLI resource configurations may include a nominal location or an associated geographical location of a UE in coverage area 110-*g* (e.g., center of mass). In some cases, at least one CLI resource configuration in the set of CLI resource configurations may include an actual location of a UE in coverage area 110-*g* (e.g., coordinates of a UE in coverage area 110-*g*, a global positioning system (GPS) assisted location of a UE in coverage area 110-*g*, etc.).

In some cases, base station 105-*h* may configure a CLI measurement configuration based on the set of CLI resource configurations base station 105-*h* receives from base station 105-*g* at 520. In some cases, base station 105-*h* may prune or remove one or more CLI resource configurations from the set of CLI resource configurations received from base station 105-*g* at 520. In some cases, base station 105-*h* prune or remove one or more associated locations received in the set of CLI resource configurations. In some cases, base station 105-*h* may remove the one or more CLI resource configurations and/or one or more associated locations based at least in part on the location of 115-*h* relative to the one or more associated locations received in the set of CLI resource configurations. In some cases, base station 105-*h* may configure the CLI measurement configuration based at least in part on the one or more removed CLI resource configurations and/or the one or more removed associated locations. For example, base station 105-*h* may configure the CLI measurement configuration to include an indication to take a CLI measurement of UE 115-*g*1, but not include an indication to take a CLI measurement of UE 115-*g*2 based on base station 105-*h* removing from the received set of CLI resource configurations a CLI resource configuration and/or location associated with UE 115-*g*2. In some cases, base station 105-*h* removing from the received set of CLI resource configurations the one or more CLI resource configurations and/or the one or more associated locations may result in reduced signaling overhead compared to conventional techniques. Accordingly, the present techniques result in reduced signaling overhead, which results in improved power savings and a reduction in processing time, both of which result in an improved user experience.

In some cases, base station 105-*h* may configure the CLI measurement configuration based on the set of CLI resource configurations base station 105-*h* receives from base station 105-*g* at 520, without pruning or removing any of the CLI resource configurations or locations from the set of CLI resource configurations received from base station 105-*g* at 520. Accordingly, in some cases, the CLI measurement configuration may include or be based on each CLI resource configuration and/or location that base station 105-*h* received from base station 105-*g* at 520.

At 525, base station 105-*h* may transmit the configured CLI measurement configuration to UE 115-*h*. In some cases, UE 115-*h* may analyze the received CLI measurement configuration and identify one or more locations associated with the received CLI measurement configuration based on the analysis. In some cases, the received CLI measurement configuration may include a location associated with UE 115-*g*1 (e.g., a transmission point of UE 115-*g*1), but not include a location of another UE from coverage area 110-*g* (e.g., UE 115-*g*2 or UE 115-*g*3, or both). In some cases, UE 115-*h* may analyze the CLI measurement configuration from base station 105-*h* at 525 and then UE 115-*h* may prune or remove one or more CLI resource configurations from the CLI measurement configuration based on the analysis (e.g., based on the location of UE 115-*h* relative to a location of a UE in coverage area 110-*g* that is indicated in the CLI measurement configuration). Similarly, UE 115-*h* may prune or remove one or more associated locations received in the CLI measurement configuration based on the analysis.

At 530, UE 115-*h* may perform one or more CLI measurements based at least in part on the analysis of the received CLI measurement configuration. For example, UE 115-*h* may determine that the received CLI measurement configuration includes CLI resource configurations and/or locations for UE 115-*g*1, UE 115-*g*2, and UE 115-*g*3. Based on analysis of the received CLI measurement configuration, UE 115-*h* may remove UE 115-*g*2 or UE 115-*g*3, or both, from the CLI measurement configuration. After removing the one or more UEs from the CLI measurement configuration, UE 115-*h* may perform CLI measurements on the UEs remaining in the CLI measurement configuration (e.g., at least UE 115-*g*1). UE 115-*h* may then generate a report that indicates one or more results of performing the one or more CLI measurements at 530 and send the report to base station 105-*h*.

Figure 6:
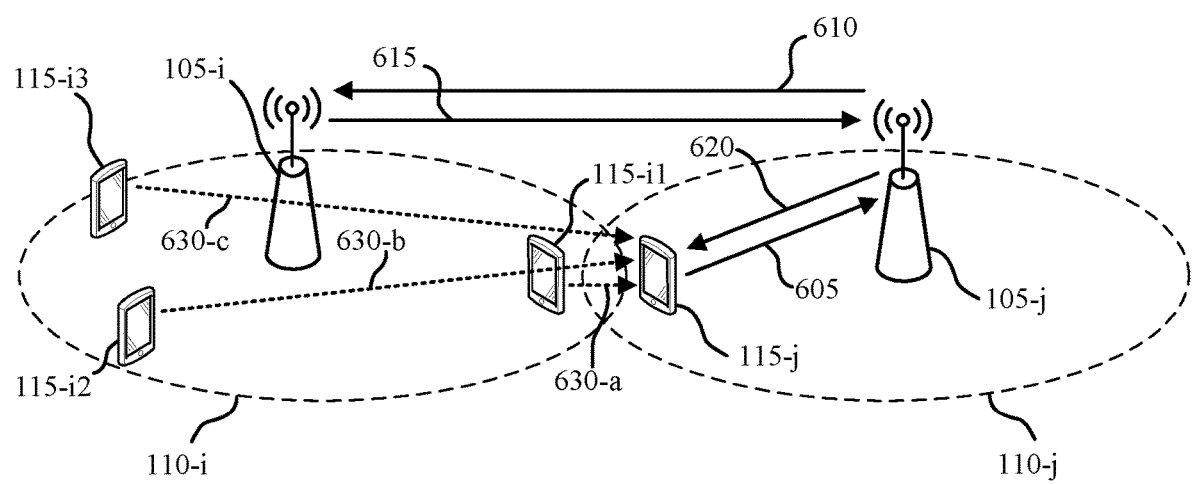
FIG. 6 illustrates an example of a wireless communications system that supports position assisted cross-link interference measurement in accordance with aspects of the present disclosure.

FIG. 6 illustrates an example of a wireless communications system 600 that supports position assisted cross-link interference measurement in accordance with aspects of the present disclosure. In some examples, wireless communications system 600 may implement aspects of a wireless communications system of FIGS. 1-5. The wireless communications system 600 may include a UE 115-*i* (e.g., UE 115-*i*1, UE 115-*i*2, UE 115-*i*3) and a UE 115-*j*, which may be examples of a UE 115 as described herein. The wireless communications system 600 may also include a base station 105-*i* and a base station 105-*j*, which may be examples of a base station 105 as described herein. Base station 105-*i* and base station 105-*j* may each be an example of a small cell (e.g., have a cell radius of a few hundred meters, less than 500 meters, less than 300 meters, etc.). The base stations 105 may each be associated with a cell which provides wireless communications with the base station 105 within a respective coverage area 110. In some cases, wireless communications system 600 may be an example of when neither an aggressor UE nor a UE victim report their respective location available to the network.

At 605, UE 115-*j* may transmit to base station 105-*j* a request (e.g., via RRC signaling) to receive CLI resource configurations to measure. In some cases, UE 115-*j* may transmit the request based on its location or may transmit the request independent from or without knowing its location.

At 610, base station 105-*j* may transmit to base station 105-*i* a request for CLI resource configurations of UE associated with coverage area 110-*i*.

At 615, base station 105-*i* may configure a set of CLI resource configurations for UEs in coverage area 110-*i* and transmit the set of CLI resource configurations to base station 105-*j*. In some cases, base station 105-*i* may transmit location information with the set of CLI resource configurations. In some cases, the location information may include one or more proxy locations. One example of the one or more proxy locations may include a location of base station 105-*i*.

In some cases, base station 105-*i* may identify two or more sectors in which the UEs of coverage area 110-*i* are located. For example, UE 115-*i*1 may be located in a first sector of coverage area 110-*i*, UE 115-*i*2 may be located in a second sector of coverage area 110-*i*, and UE 115-*i*3 may be located in a third sector of coverage area 110-*i*. In some cases, base station 105-*i* may configure a first CLI resource configuration for all UEs in the first sector (e.g., at least UE 11541), configure a second CLI resource configuration for all UEs in the second sector (e.g., at least UE 115-*i*2), and configure a third CLI resource configuration for all UEs in the third sector (e.g., at least UE 115-*i*3). In some cases, base station 105-*i* may determine a nominal location for each sector and send the nominal location of each sector with the set of CLI resource configurations. For example, base station 105-*i* may send a first nominal location of the first sector with a first CLI resource configuration for all UEs in the first sector (e.g., at least UE 11541), send a second nominal location of the second sector with a second CLI resource configuration for all UEs in the second sector (e.g., at least UE 115-*i*2), send a third nominal location of the third sector with a third CLI resource configuration for all UEs in the third sector (e.g., at least UE 115-*i*3), and so forth.

At 620, base station 105-*j* may send the CLI measurement configuration to UE 115-*j*. In some cases, base station 105-*j* may analyze the set of CLI resource configurations and any associated location information received from base station 105-*i* at 615 and generate the CLI measurement configuration based on the analysis. In some cases, base station 105-*j* may determine one or more proxy locations or nominal locations unlikely to affect communication or interfere with UE 115-*j*. In some cases, base station 105-*j* may configure the CLI measurement configuration without the one or more proxy locations or nominal locations that base station 105-*j* determines are unlikely to affect communication or interfere with UE 115-*j*. Similarly, base station 105-*j* may determine one or more proxy locations or nominal locations likely to affect or interfere with UE 115-*j*. In some cases, base station 105-*j* may configure the CLI measurement configuration to include the one or more proxy locations or nominal locations that base station 105-*j* determines are likely to affect communication or interfere with UE 115-*j*.

At 630, UE 115-*i* may perform one or more CLI measurements based at least in part on an analysis of the received CLI measurement configuration. For example, UE 115-*i* may determine that the received CLI measurement configuration includes CLI resource configurations and proxy or nominal locations for UE 115-*j*1, UE 115-*j*2, and UE 115-*j*3. Based on analysis of the received CLI measurement configuration, UE 115-*i* may remove UE 115-*j*2 or UE 115-*j*3, or both, from the CLI measurement configuration. After removing the one or more UEs from the CLI measurement configuration, UE 115-*i* may perform CLI measurements on the UEs remaining in the CLI measurement configuration (e.g., at least UE 115-*j*1). In one example, UE 115-*i* may perform CLI measurements on UE 115-*i*1 and UE 115-*i*2, but bypass performing CLI measurements on UE 115-*i*3. In some cases, UE 115-*i*1 and UE 115-*i*2 may both transmit the same CLI resource configuration (e.g., via SRS signaling) when base station 105-*i* sends a proxy location with the set of CLI resource configurations at 615. In some cases, UE 115-*i*1 and UE 115-*i*2 may transmit different CLI resource configuration (e.g., first sector CLI resource configuration and a second sector CLI resource configuration) when base station 105-*i* sends a different nominal location for each sector of coverage area 110-*i*. In some cases, UE 115-*i* may then generate a report that indicates one or more results of performing the one or more CLI measurements at 630 and send the report to base station 105-*i*.

Figure 7:
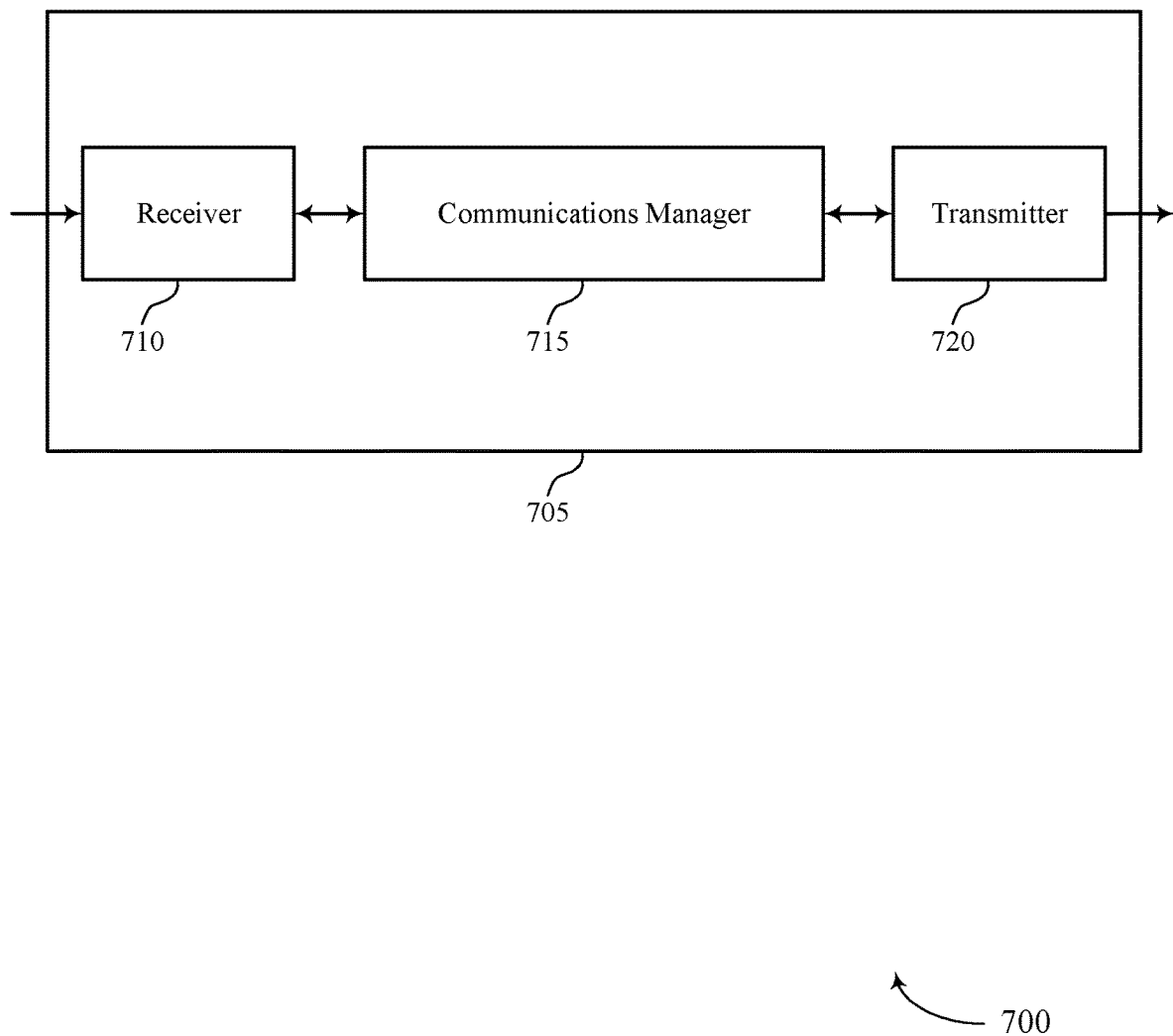
FIGS. 7 and 8 show diagrams of devices that support position assisted cross-link interference measurement in accordance with aspects of the present disclosure.

FIG. 7 shows a diagram 700 of a device 705 that supports position assisted cross-link interference measurement in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to position assisted cross-link interference measurement, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a first base station, a set of cross-link interference measurement configurations associated with location information, perform a cross-link interference measurement procedure on signals received based on the set of cross-link interference measurement configurations, or the location information, or a location of the first UE, or a combination thereof, and transmit, to the first base station, a measurement value based on the performed cross-link interference measurement procedure. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
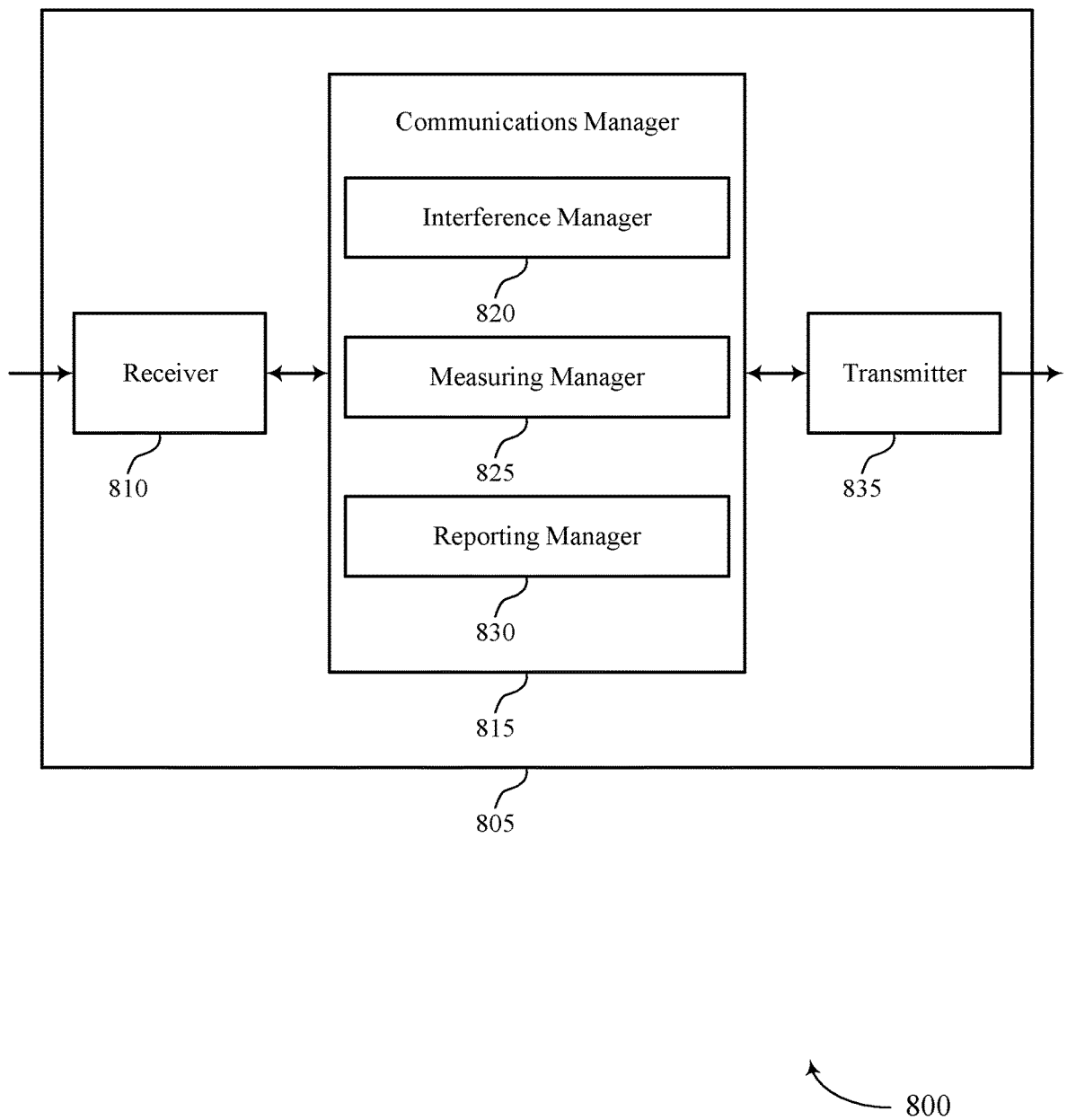

FIG. 8 shows a diagram 800 of a device 805 that supports position assisted cross-link interference measurement in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to position assisted cross-link interference measurement, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an interference manager 820, a measuring manager 825, and a reporting manager 830. The communications manager 815 may be an example of aspects of the communications manager 1010 described herein.

The interference manager 820 may receive, from a first base station, a set of cross-link interference measurement configurations associated with location information.

The measuring manager 825 may perform a cross-link interference measurement procedure on signals received based on the set of cross-link interference measurement configurations, or the location information, or a location of the first UE, or a combination thereof.

The reporting manager 830 may transmit, to the first base station, a measurement value based on the performed cross-link interference measurement procedure.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
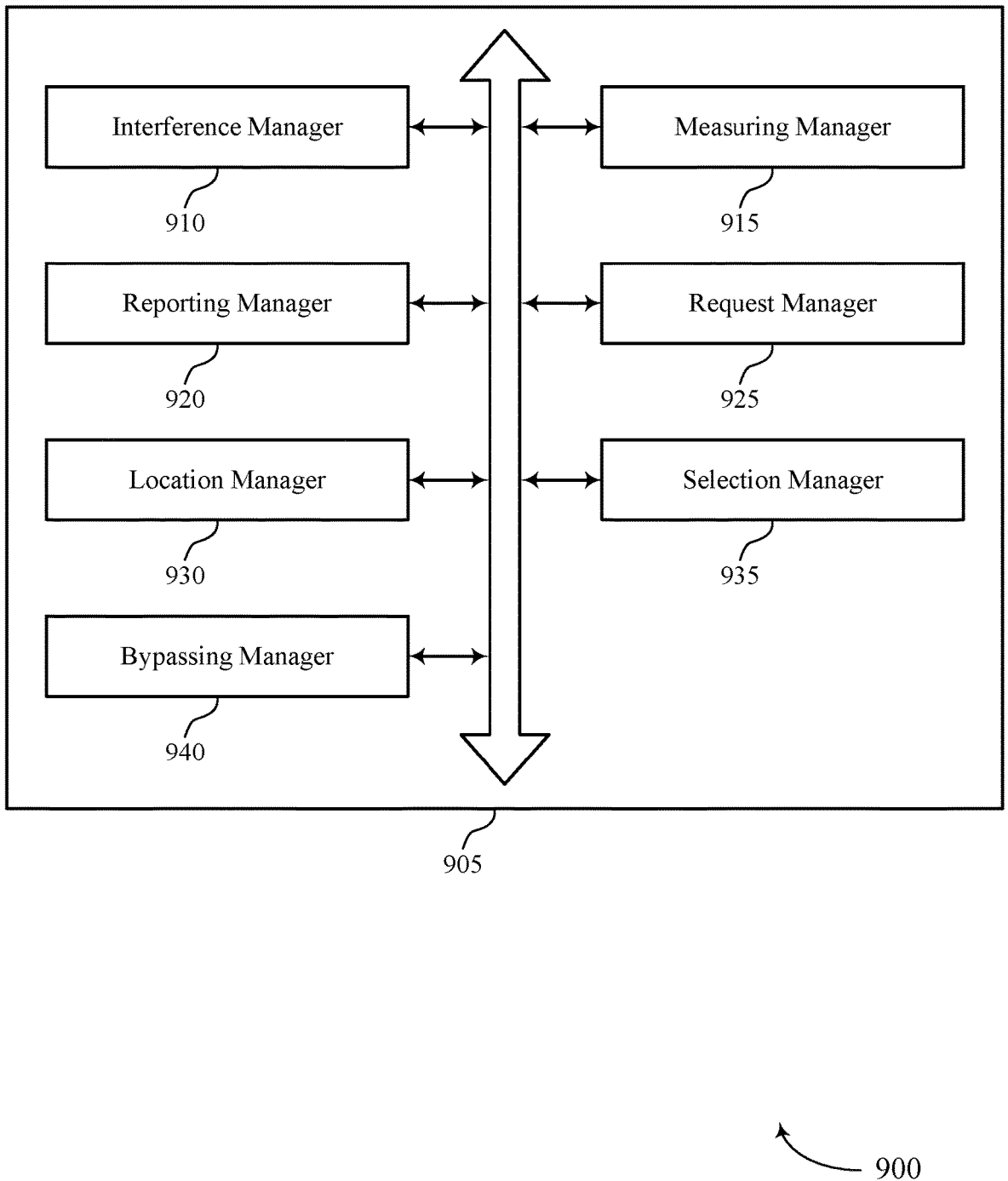
FIG. 9 shows a diagram of a communications manager that supports position assisted cross-link interference measurement in accordance with aspects of the present disclosure.

FIG. 9 shows a diagram 900 of a communications manager 905 that supports position assisted cross-link interference measurement in accordance with aspects of the present disclosure. The communications manager 905 may be an example of aspects of a communications manager 715, a communications manager 815, or a communications manager 1010 described herein. The communications manager 905 may include an interference manager 910, a measuring manager 915, a reporting manager 920, a request manager 925, a location manager 930, a selection manager 935, and a bypassing manager 940. Each of these modules may communicate, directly or indirectly, with one another (e.g., via one or more buses).

The interference manager 910 may receive, from a first base station, a set of cross-link interference measurement configurations associated with location information. In some examples, the interference manager 910 may receive radio resource control signaling that indicates the set of cross-link interference measurement configurations and the location information.

In some cases, the cross-link interference resource configuration of the second cell includes a sounding reference signal associated with at least one UE of the second cell, or an uplink configuration associated with at least one UE of the second cell, or a downlink configuration associated with at least one UE of the second cell, or uplink symbols associated with at least one UE of the second cell, or downlink symbols associated with at least one UE of the second cell, or a slot format associated with at least one UE of the second cell, or a combination thereof.

In some cases, the set of cross-link interference measurement configurations include an indication to measure a received signal strength, or a received power of a sounding reference signal, or a combination thereof, for at least one UE of the second cell. The measuring manager 915 may perform a cross-link interference measurement procedure on signals received based on the set of cross-link interference measurement configurations, or the location information, or a location of the first UE, or a combination thereof.

In some examples, the measuring manager 915 may perform the cross-link interference measurement procedure is based on the location of the first UE. In some examples, the measuring manager 915 may perform the cross-link interference measurement procedure is based on the first UE removing at least one location of the second cell from the location information.

In some examples, the measuring manager 915 may perform, based on a location of the first UE, the cross-link interference measurement procedure on a first cross-link interference reference signal using a cross-link interference measurement configuration associated with the first location by assuming that a transmission point of the first cross-link interference reference signal is at the first location.

In some examples, the measuring manager 915 may perform the cross-link interference measurement procedure on one or more UEs associated with the geographic region. In some examples, the measuring manager 915 may receive a cross-link interference resource configuration from at least one UE of the one or more UEs in the geographic region, where the cross-link interference measurement procedure is performed on the at least one UE based on the received cross-link interference resource configuration.

In some examples, the measuring manager 915 may assume that a location from the location information corresponds to a physical location transmitting a corresponding reference signal. In some cases, the measurement value includes a measurement value for the first location and omits a measurement value for the second location. The reporting manager 920 may transmit, to the first base station, a measurement value based on the performed cross-link interference measurement procedure.

The request manager 925 may transmit, to the first base station, a request for the set of cross-link interference measurement configurations and the location information, where the set of cross-link interference measurement configurations are received at least in part in response to the transmitted request.

The location manager 930 may determine a location of the first UE, where the location information includes the location of the first UE. In some examples, the location manager 930 may transmit, to the first base station, the determined location of the first UE, where the set of cross-link interference measurement configurations are configured based on the determined location of the first UE transmitted to the first base station.

In some examples, the location manager 930 may receive an indication of the first location from the first base station or a UE of the second cell. In some cases, the location information includes a location of a second base station of the second cell, or a physical location of a UE from the second cell, or an estimated location of a UE from the second cell, or a combination thereof.

The selection manager 935 may select a first location of the location information for cross-link interference measurement. The bypassing manager 940 may bypass performing, based on a location of the first UE, the cross-link interference measurement procedure on a second cross-link interference reference signal using a cross-link interference measurement configuration associated with a second location of the location information by assuming that a transmission point of the second cross-link interference reference signal is different than the first location.

Figure 10:
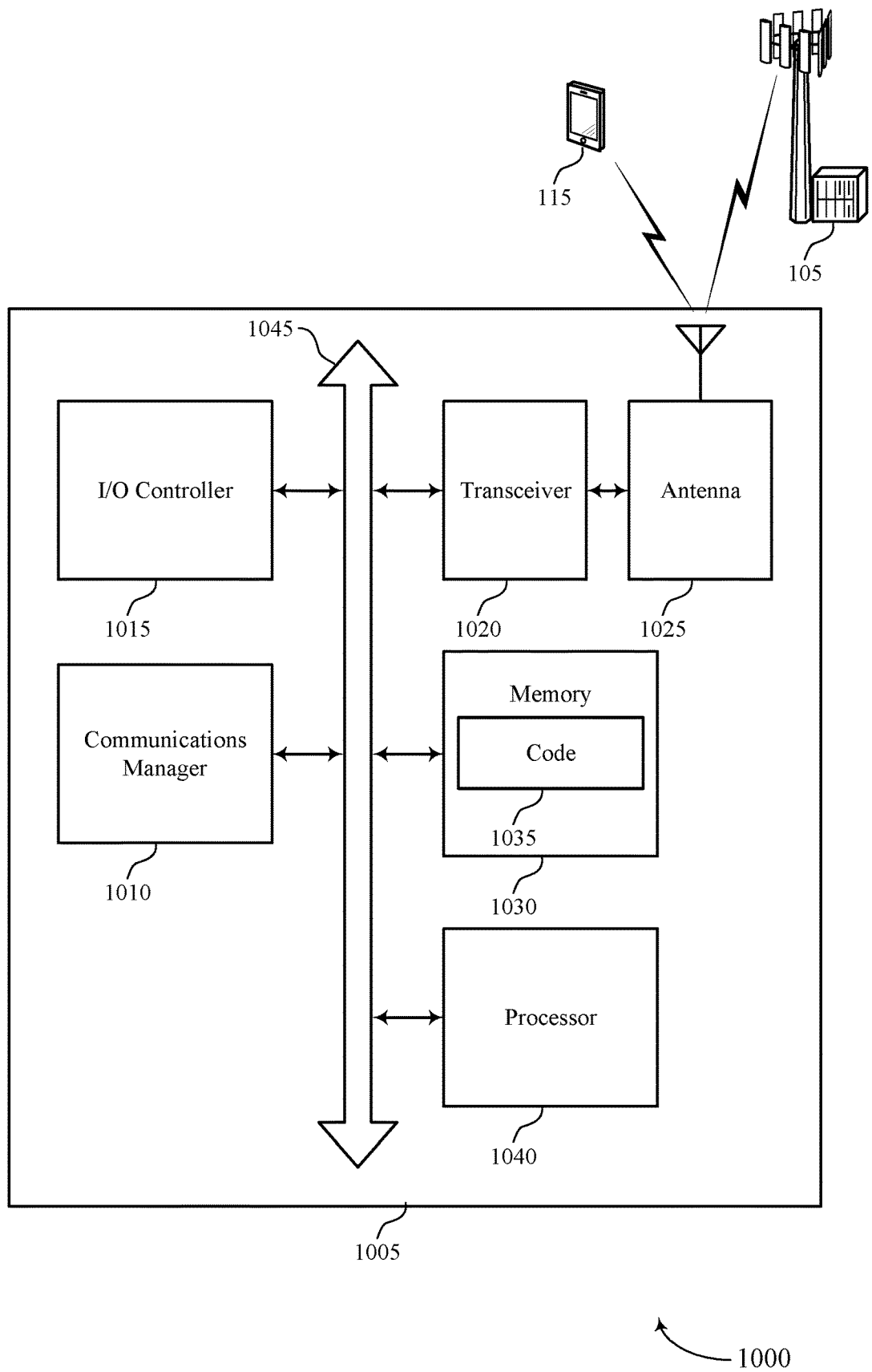
FIG. 10 shows a diagram of a system including a device that supports position assisted cross-link interference measurement in accordance with aspects of the present disclosure.

FIG. 10 shows a diagram of a system 1000 including a device 1005 that supports position assisted cross-link interference measurement in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a first base station, a set of cross-link interference measurement configurations associated with location information, perform a cross-link interference measurement procedure on signals received based on the set of cross-link interference measurement configurations, or the location information, or a location of the first UE, or a combination thereof, and transmit, to the first base station, a measurement value based on the performed cross-link interference measurement procedure.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting position assisted cross-link interference measurement).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
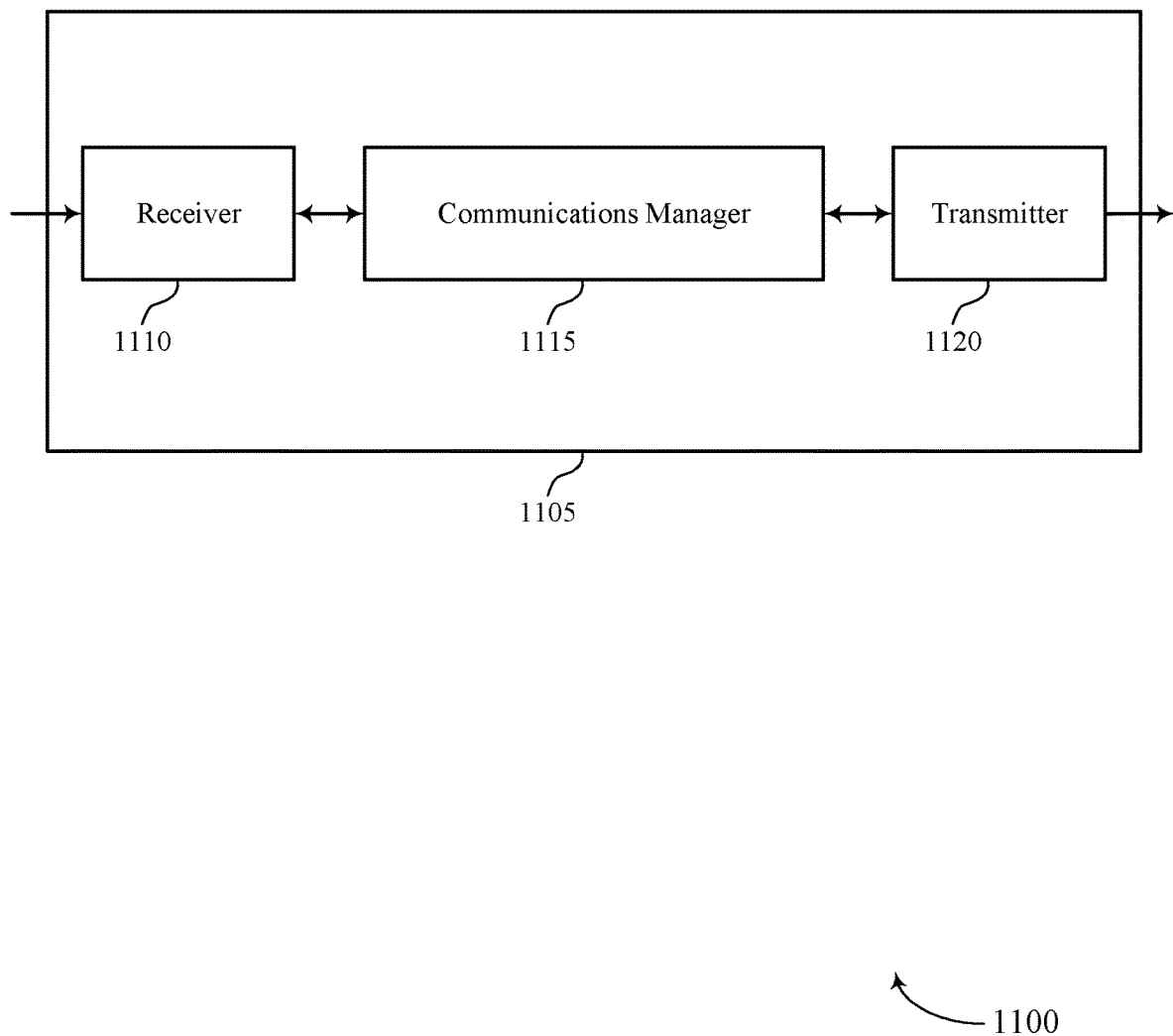
FIGS. 11 and 12 show diagrams of devices that support position assisted cross-link interference measurement in accordance with aspects of the present disclosure.

FIG. 11 shows a diagram 1100 of a device 1105 that supports position assisted cross-link interference measurement in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to position assisted cross-link interference measurement, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, from a second base station of a second cell, a set of cross-link interference resource configurations of one or more user equipments (UEs) of the second cell and location information, determine, based on the set of cross-link interference resource configurations, a cross-link interference measurement configuration for a first UE of the first cell, and transmit, to the first UE, an indication of the determined cross-link interference measurement configuration and the location information. The communications manager 1115 may also receive, from a first base station of a first cell and at a second base station of a second cell, a request for cross-link interference resource configuration of one or more user equipments (UEs) of the second cell, determine location information associated with the one or more UEs, and transmit, to the first base station, a set of cross-link interference resource configurations of the one or more UEs and the determined location information. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
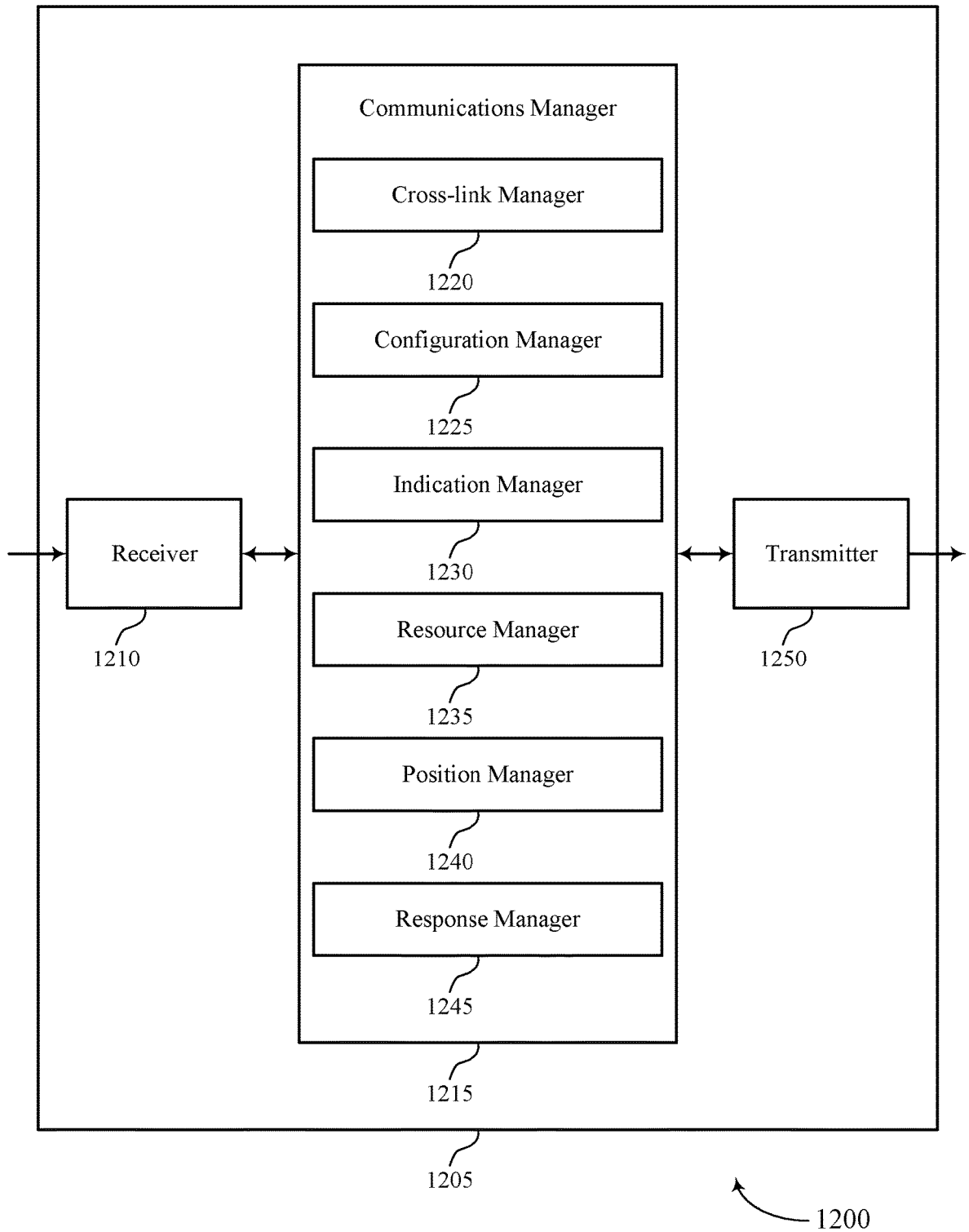

FIG. 12 shows a diagram 1200 of a device 1205 that supports position assisted cross-link interference measurement in accordance with aspects of the present disclosure. The device 1205 may be an example of aspects of a device 1105, or a base station 105 as described herein. The device 1205 may include a receiver 1210, a communications manager 1215, and a transmitter 1250. The device 1205 may also include a processor. Each of these components may be in communication with one another (e.g., via one or more buses).

The receiver 1210 may receive information such as packets, user data, or control information associated with various information channels (e.g., control channels, data channels, and information related to position assisted cross-link interference measurement, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a cross-link manager 1220, a configuration manager 1225, an indication manager 1230, a resource manager 1235, a position manager 1240, and a response manager 1245. The communications manager 1215 may be an example of aspects of the communications manager 1410 described herein.

The cross-link manager 1220 may receive, from a second base station of a second cell, a set of cross-link interference resource configurations of one or more user equipments (UEs) of the second cell and location information. The configuration manager 1225 may determine, based on the set of cross-link interference resource configurations, a cross-link interference measurement configuration for a first UE of the first cell. The indication manager 1230 may transmit, to the first UE, an indication of the determined cross-link interference measurement configuration and the location information.

The resource manager 1235 may receive, from a first base station of a first cell and at a second base station of a second cell, a request for cross-link interference resource configuration of one or more user equipments (UEs) of the second cell. The position manager 1240 may determine location information associated with the one or more UEs. The response manager 1245 may transmit, to the first base station, a set of cross-link interference resource configurations of the one or more UEs and the determined location information.

The transmitter 1250 may transmit signals generated by other components of the device 1205. In some examples, the transmitter 1250 may be collocated with a receiver 1210 in a transceiver module. For example, the transmitter 1250 may be an example of aspects of the transceiver 1420 described with reference to FIG. 14. The transmitter 1250 may utilize a single antenna or a set of antennas.

Figure 13:
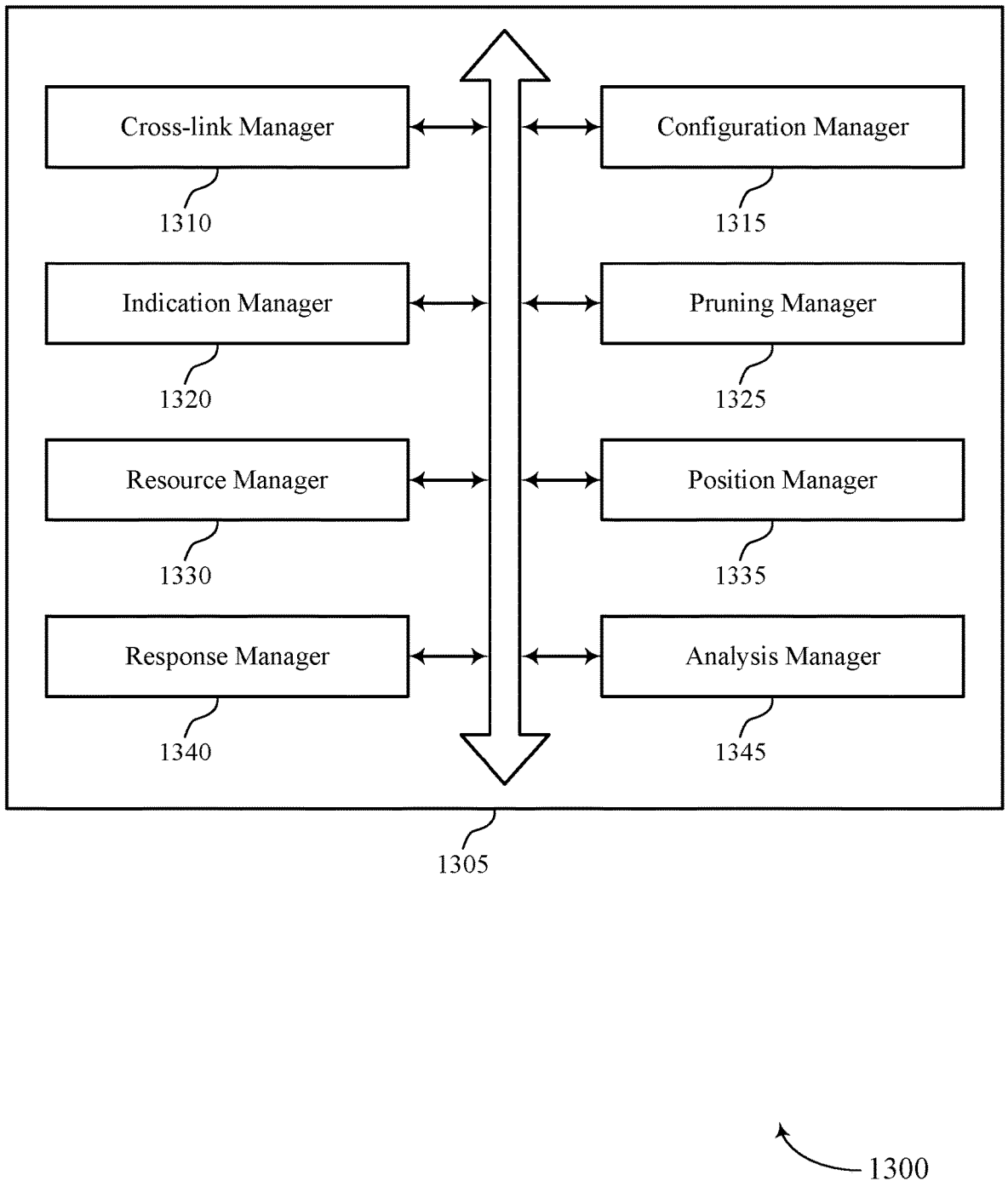
FIG. 13 shows a diagram of a communications manager that supports position assisted cross-link interference measurement in accordance with aspects of the present disclosure.

FIG. 13 shows a diagram 1300 of a communications manager 1305 that supports position assisted cross-link interference measurement in accordance with aspects of the present disclosure. The communications manager 1305 may be an example of aspects of a communications manager 1115, a communications manager 1215, or a communications manager 1410 described herein. The communications manager 1305 may include a cross-link manager 1310, a configuration manager 1315, an indication manager 1320, a pruning manager 1325, a resource manager 1330, a position manager 1335, a response manager 1340, and an analysis manager 1345. Each of these modules may communicate, directly or indirectly, with one another (e.g., via one or more buses).

The cross-link manager 1310 may receive, from a second base station of a second cell, a set of cross-link interference resource configurations of one or more user equipments (UEs) of the second cell and location information. In some cases, the determined location information includes a location of the second base station.

In some examples, the cross-link manager 1310 may transmit, to the second base station, a request for cross-link interference resource configuration of the one or more UEs. In some examples, the cross-link manager 1310 may receive a measurement report from the first UE. The configuration manager 1315 may determine, based on the set of cross-link interference resource configurations, a cross-link interference measurement configuration for a first UE of the first cell.

In some examples, the configuration manager 1315 may determine the cross-link interference measurement configuration based on the location information, where the location information includes a location of the second base station, or a physical location of a UE from the second cell, or an estimated location of a UE from the second cell, or a combination thereof.

In some examples, the configuration manager 1315 may determine location information for the first UE, where determining the cross-link interference measurement configuration is based on the location information for the first UE. In some examples, the configuration manager 1315 may adjust a communication link between the first base station and the first UE based on the received measurement report.

The indication manager 1320 may transmit, to the first UE, an indication of the determined cross-link interference measurement configuration and the location information. The resource manager 1330 may receive, from a first base station of a first cell and at a second base station of a second cell, a request for cross-link interference resource configuration of one or more user equipments (UEs) of the second cell.

In some examples, the resource manager 1330 may determine the set of cross-link interference resource configurations based on the determined location information associated with the at least one of the one or more UEs. The position manager 1335 may determine location information associated with the one or more UEs. In some examples, the position manager 1335 may determine location information associated with at least one of the one or more UEs.

In some examples, the position manager 1335 may determine location information associated with a first UE of the first cell. In some cases, the location of the second base station is a proxy location for at least one UE of the first cell.

The response manager 1340 may transmit, to the first base station, a set of cross-link interference resource configurations of the one or more UEs and the determined location information.

In some examples, the response manager 1340 may transmit the set of cross-link interference resource configurations and the determined location information via radio resource control signaling.

The pruning manager 1325 may remove one or more cross-link interference resource configurations from the set of cross-link interference resource configurations, where determining the cross-link interference measurement configuration is based on the set of cross-link interference resource configurations with the one or more cross-link interference resource configurations removed.

In some examples, the pruning manager 1325 may remove a location from the location information, where the cross-link interference measurement configuration is for measuring a received power of a sounding reference signal, or a received signal strength, or a combination thereof.

The analysis manager 1345 may determine the set of cross-link interference resource configurations based on the determined location information associated with the first UE.

Figure 14:
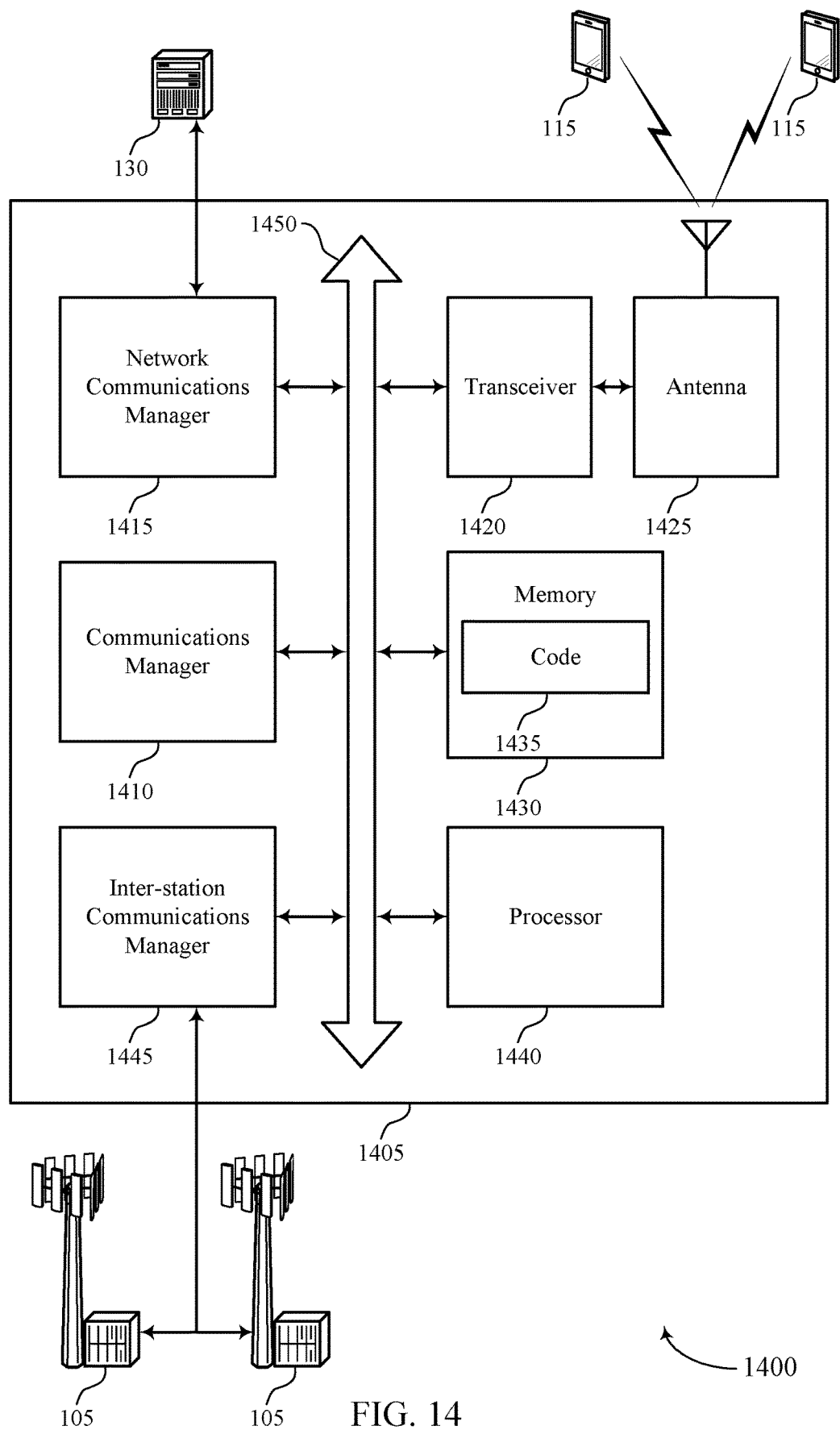
FIG. 14 shows a diagram of a system including a device that supports position assisted cross-link interference measurement in accordance with aspects of the present disclosure.

FIG. 14 shows a diagram of a system 1400 including a device 1405 that supports position assisted cross-link interference measurement in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive, from a second base station of a second cell, a set of cross-link interference resource configurations of one or more user equipments (UEs) of the second cell and location information, determine, based on the set of cross-link interference resource configurations, a cross-link interference measurement configuration for a first UE of the first cell, and transmit, to the first UE, an indication of the determined cross-link interference measurement configuration and the location information. The communications manager 1410 may also receive, from a first base station of a first cell and at a second base station of a second cell, a request for cross-link interference resource configuration of one or more user equipments (UEs) of the second cell, determine location information associated with the one or more UEs, and transmit, to the first base station, a set of cross-link interference resource configurations of the one or more UEs and the determined location information.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting position assisted cross-link interference measurement).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
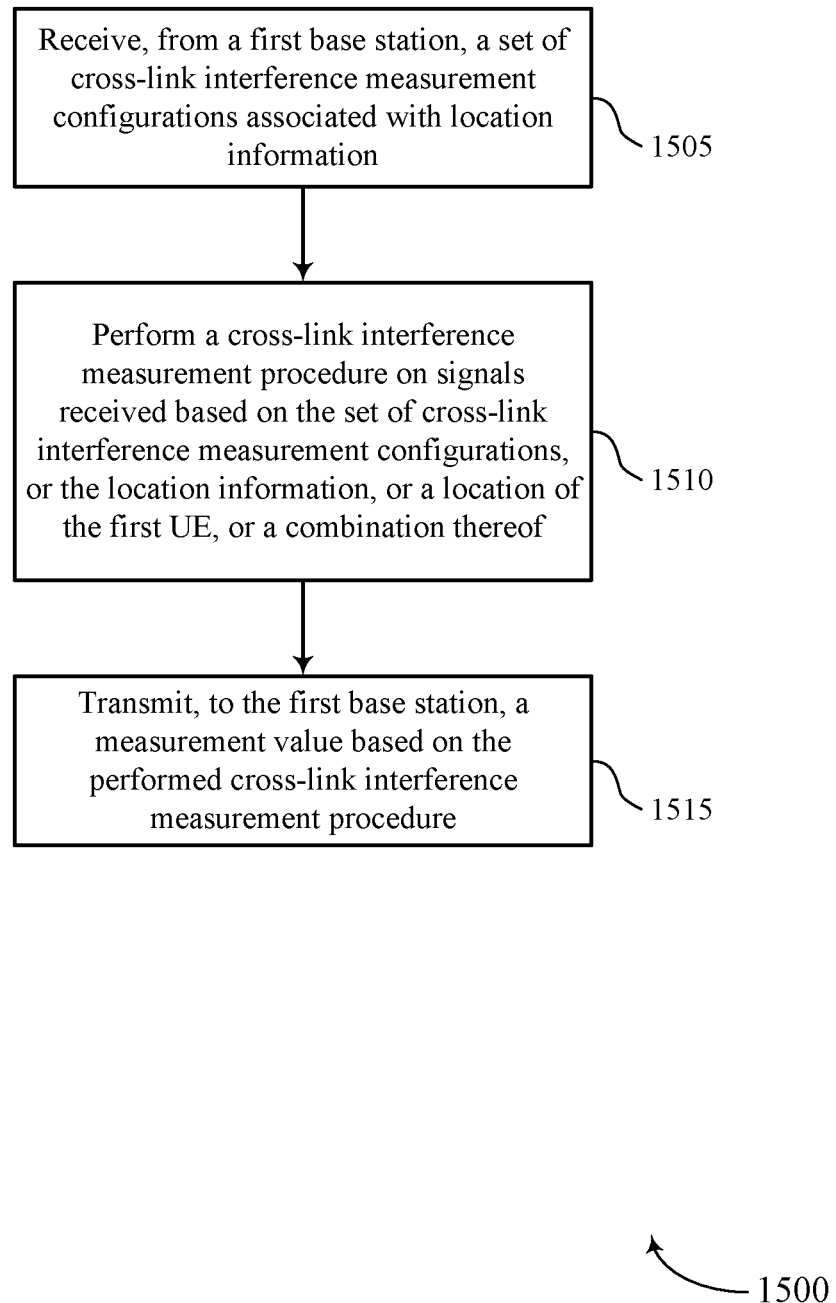
FIGS. 15 through 18 show flowcharts illustrating methods that support position assisted cross-link interference measurement in accordance with aspects of the present disclosure.

FIG. 15 shows a flowchart illustrating a method 1500 that supports position assisted cross-link interference measurement in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a first base station, a set of cross-link interference measurement configurations associated with location information. The operations of 1505 may be performed according to the methods described herein. In some examples, aspects of the operations of 1505 may be performed by an interference manager as described with reference to FIGS. 7 through 10.

At 1510, the UE may perform a cross-link interference measurement procedure on signals received based on the set of cross-link interference measurement configurations, or the location information, or a location of the first UE, or a combination thereof. The operations of 1510 may be performed according to the methods described herein. In some examples, aspects of the operations of 1510 may be performed by a measuring manager as described with reference to FIGS. 7 through 10.

At 1515, the UE may transmit, to the first base station, a measurement value based on the performed cross-link interference measurement procedure. The operations of 1515 may be performed according to the methods described herein. In some examples, aspects of the operations of 1515 may be performed by a reporting manager as described with reference to FIGS. 7 through 10.

Figure 16:
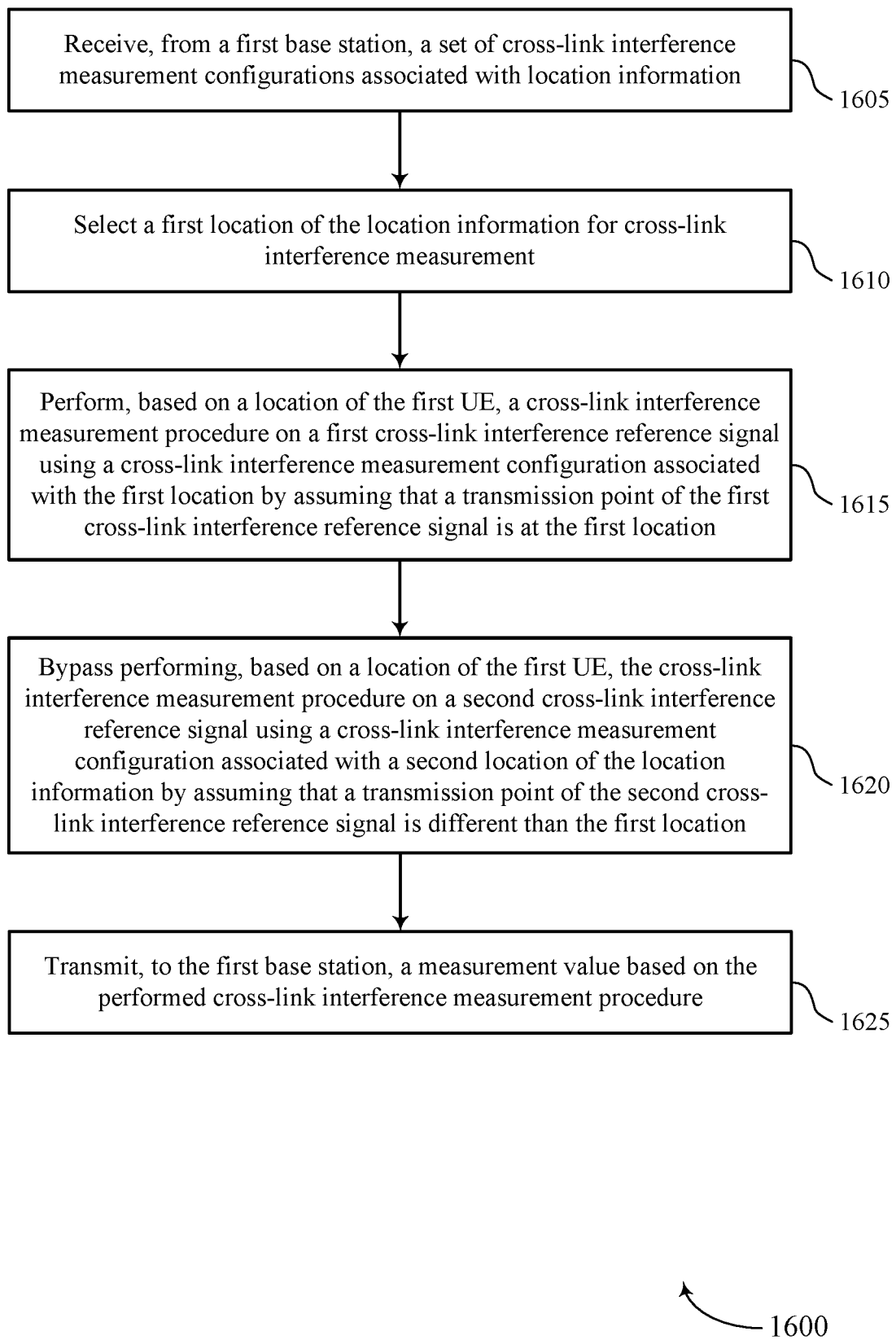

FIG. 16 shows a flowchart illustrating a method 1600 that supports position assisted cross-link interference measurement in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a first base station, a set of cross-link interference measurement configurations associated with location information. The operations of 1605 may be performed according to the methods described herein. In some examples, aspects of the operations of 1605 may be performed by an interference manager as described with reference to FIGS. 7 through 10.

At 1610, the UE may select a first location of the location information for cross-link interference measurement. The operations of 1610 may be performed according to the methods described herein. In some examples, aspects of the operations of 1610 may be performed by a selection manager as described with reference to FIGS. 7 through 10.

At 1615, the UE may perform, based on a location of the first UE, the cross-link interference measurement procedure on a first cross-link interference reference signal using a cross-link interference measurement configuration associated with the first location by assuming that a transmission point of the first cross-link interference reference signal is at the first location. The operations of 1615 may be performed according to the methods described herein. In some examples, aspects of the operations of 1615 may be performed by a measuring manager as described with reference to FIGS. 7 through 10.

At 1620, the UE may bypass performing, based on a location of the first UE, the cross-link interference measurement procedure on a second cross-link interference reference signal using a cross-link interference measurement configuration associated with a second location of the location information by assuming that a transmission point of the second cross-link interference reference signal is different than the first location. The operations of 1620 may be performed according to the methods described herein. In some examples, aspects of the operations of 1620 may be performed by a bypassing manager as described with reference to FIGS. 7 through 10.

At 1625, the UE may transmit, to the first base station, a measurement value based on the performed cross-link interference measurement procedure. The operations of 1625 may be performed according to the methods described herein. In some examples, aspects of the operations of 1625 may be performed by a reporting manager as described with reference to FIGS. 7 through 10.

Figure 17:
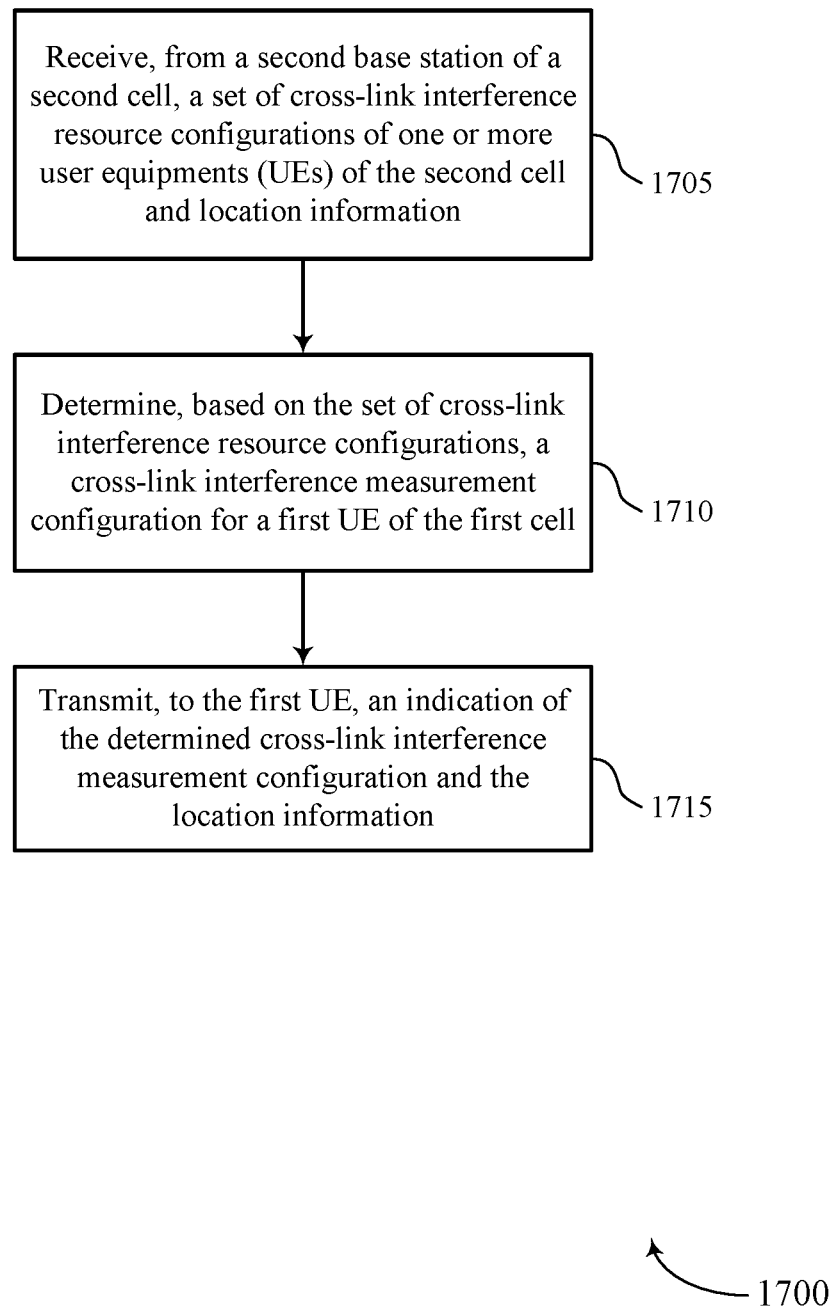

FIG. 17 shows a flowchart illustrating a method 1700 that supports position assisted cross-link interference measurement in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may receive, from a second base station of a second cell, a set of cross-link interference resource configurations of one or more user equipments (UEs) of the second cell and location information. The operations of 1705 may be performed according to the methods described herein. In some examples, aspects of the operations of 1705 may be performed by a cross-link manager as described with reference to FIGS. 11 through 14.

At 1710, the base station may determine, based on the set of cross-link interference resource configurations, a cross-link interference measurement configuration for a first UE of the first cell. The operations of 1710 may be performed according to the methods described herein. In some examples, aspects of the operations of 1710 may be performed by a configuration manager as described with reference to FIGS. 11 through 14.

At 1715, the base station may transmit, to the first UE, an indication of the determined cross-link interference measurement configuration and the location information. The operations of 1715 may be performed according to the methods described herein. In some examples, aspects of the operations of 1715 may be performed by an indication manager as described with reference to FIGS. 11 through 14.

Figure 18:
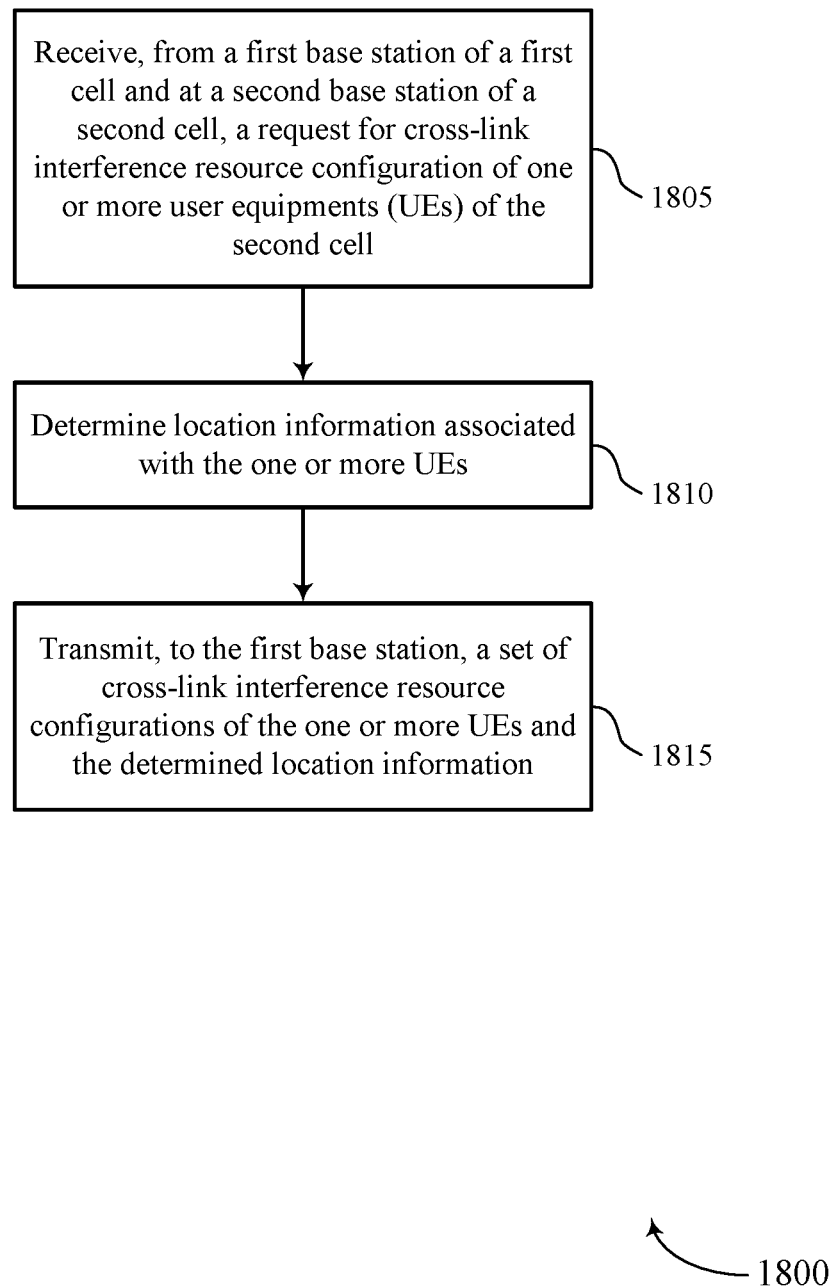

FIG. 18 shows a flowchart illustrating a method 1800 that supports position assisted cross-link interference measurement in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may receive, from a first base station of a first cell and at a second base station of a second cell, a request for cross-link interference resource configuration of one or more user equipments (UEs) of the second cell. The operations of 1805 may be performed according to the methods described herein. In some examples, aspects of the operations of 1805 may be performed by a resource manager as described with reference to FIGS. 11 through 14.

At 1810, the base station may determine location information associated with the one or more UEs. The operations of 1810 may be performed according to the methods described herein. In some examples, aspects of the operations of 1810 may be performed by a position manager as described with reference to FIGS. 11 through 14.

At 1815, the base station may transmit, to the first base station, a set of cross-link interference resource configurations of the one or more UEs and the determined location information. The operations of 1815 may be performed according to the methods described herein. In some examples, aspects of the operations of 1815 may be performed by a response manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius, 2 to 30 kilometers in radius, etc.) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE) of a first cell, comprising:
    transmitting, to a first access network entity, a request for a set of cross-link interference measurement configurations and location information;
    receiving, from the first access network entity, the set of cross-link interference measurement configurations associated with the location information in response to the request;
    performing a cross-link interference measurement procedure on signals received based at least in part on the set of cross-link interference measurement configurations, or the location information, or a location of the first UE, or a combination thereof; and
    transmitting, to the first access network entity, a measurement value based at least in part on the performed cross-link interference measurement procedure.

2. The method of claim 1, further comprising:
    determining a location of the first UE, wherein the location information includes the location of the first UE; and
    transmitting, to the first access network entity, the determined location of the first UE, wherein the set of cross-link interference measurement configurations are configured based at least in part on the determined location of the first UE transmitted to the first access network entity.

3. The method of claim 2, wherein:
    performing the cross-link interference measurement procedure is based at least in part on the location of the first UE.

4. The method of claim 1, wherein:
    performing the cross-link interference measurement procedure is based at least in part on the first UE removing at least one location of a second cell from the location information.

5. The method of claim 1, wherein performing the cross-link interference measurement procedure further comprises:
    selecting a first location of the location information for cross-link interference measurement;
    performing, based at least in part on a location of the first UE, the cross-link interference measurement procedure on a first cross-link interference reference signal using a cross-link interference measurement configuration associated with the first location by assuming that a transmission point of the first cross-link interference reference signal is at the first location; and
    bypassing performing, based at least in part on a location of the first UE, the cross-link interference measurement procedure on a second cross-link interference reference signal using a cross-link interference measurement configuration associated with a second location of the location information by assuming that a transmission point of the second cross-link interference reference signal is different than the first location.

6. The method of claim 5, wherein the measurement value includes a measurement value for the first location and omits a measurement value for the second location.

7. The method of claim 5, further comprising:
    receiving an indication of the first location from the first access network entity or a UE of a second cell.

8. The method of claim 1, wherein the location corresponds to a geographic region, and performing the cross-link interference measurement procedure comprises:
    performing the cross-link interference measurement procedure on one or more UEs associated with the geographic region.

9. The method of claim 8, further comprising:
    receiving a cross-link interference resource configuration from at least one UE of the one or more UEs in the geographic region, wherein the cross-link interference measurement procedure is performed on the at least one UE based at least in part on the received cross-link interference resource configuration.

10. The method of claim 1, wherein receiving the set of cross-link interference measurement configurations and the location information comprises:
receiving radio resource control signaling that indicates the set of cross-link interference measurement configurations and the location information.

11. The method of claim 1, wherein a cross-link interference resource configuration of a second cell comprises a sounding reference signal associated with at least one UE of the second cell, or an uplink configuration associated with at least one UE of the second cell, or a downlink configuration associated with at least one UE of the second cell, or uplink symbols associated with at least one UE of the second cell, or downlink symbols associated with at least one UE of the second cell, or a slot format associated with at least one UE of the second cell, or a combination thereof.

12. The method of claim 1, wherein the set of cross-link interference measurement configurations comprise an indication to measure a received signal strength, or a received power of a sounding reference signal, or a combination thereof, for at least one UE of a second cell.

13. The method of claim 1, wherein performing the cross-link interference measurement procedure further comprises:
assuming that a location from the location information corresponds to a physical location transmitting a corresponding reference signal.

14. The method of claim 1, wherein the location information includes a location of a second access network entity of a second cell, or a physical location of a UE from the second cell, or an estimated location of a UE from the second cell, or a combination thereof.

15. An apparatus for wireless communications at a first user equipment (UE) of a first cell, comprising:
a processor;
memory coupled with the processor; and
instructions stored in the memory and executable by the processor to cause the apparatus to:
transmit, to a first access network entity, a request for a set of cross-link interference measurement configurations and location information;
receive, from the first access network entity, the set of cross-link interference measurement configurations associated with the location information in response to the request;
perform a cross-link interference measurement procedure on signals received based at least in part on the set of cross-link interference measurement configurations, or the location information, or a location of the first UE, or a combination thereof; and
transmit, to the first access network entity, a measurement value based at least in part on the performed cross-link interference measurement procedure.

16. The apparatus of claim 15, wherein the instructions are further executable by the processor to cause the apparatus to:
determine a location of the first UE, wherein the location information includes the location of the first UE; and
transmit, to the first access network entity, the determined location of the first UE, wherein the set of cross-link interference measurement configurations are configured based at least in part on the determined location of the first UE transmitted to the first access network entity.

17. The apparatus of claim 16, wherein performing the cross-link interference measurement procedure is based at least in part on the location of the first UE.

18. The apparatus of claim 15, wherein performing the cross-link interference measurement procedure is based at least in part on the first UE removing at least one location of a second cell from the location information.

19. The apparatus of claim 15, wherein the instructions to perform the cross-link interference measurement procedure are further executable by the processor to cause the apparatus to:
select a first location of the location information for cross-link interference measurement;
perform, based at least in part on a location of the first UE, the cross-link interference measurement procedure on a first cross-link interference reference signal using a cross-link interference measurement configuration associated with the first location by assuming that a transmission point of the first cross-link interference reference signal is at the first location; and
bypassing perform, based at least in part on a location of the first UE, the cross-link interference measurement procedure on a second cross-link interference reference signal using a cross-link interference measurement configuration associated with a second location of the location information by assuming that a transmission point of the second cross-link interference reference signal is different than the first location.

20. The apparatus of claim 19, wherein the measurement value includes a measurement value for the first location and omits a measurement value for the second location.

21. The apparatus of claim 19, wherein the instructions are further executable by the processor to cause the apparatus to:
receive an indication of the first location from the first access network entity or a UE of a second cell.

22. The apparatus of claim 15, wherein the location corresponds to a geographic region, and the instructions to perform the cross-link interference measurement procedure are executable by the processor to cause the apparatus to:
perform the cross-link interference measurement procedure on one or more UEs associated with the geographic region.

23. The apparatus of claim 22, wherein the instructions are further executable by the processor to cause the apparatus to:
receive a cross-link interference resource configuration from at least one UE of the one or more UEs in the geographic region, wherein the cross-link interference measurement procedure is performed on the at least one UE based at least in part on the received cross-link interference resource configuration.

24. The apparatus of claim 15, wherein the instructions to receive the set of cross-link interference measurement configurations and the location information are executable by the processor to cause the apparatus to:
receive radio resource control signaling that indicates the set of cross-link interference measurement configurations and the location information.

25. The apparatus of claim 15, wherein a cross-link interference resource configuration of a second cell comprises a sounding reference signal associated with at least one UE of the second cell, or an uplink configuration associated with at least one UE of the second cell, or a downlink configuration associated with at least one UE of the second cell, or uplink symbols associated with at least one UE of the second cell, or downlink symbols associated with at least one UE of the second cell, or a slot format associated with at least one UE of the second cell, or a combination thereof.

26. The apparatus of claim 15, wherein the set of cross-link interference measurement configurations comprise an indication to measure a received signal strength, or a received power of a sounding reference signal, or a combination thereof, for at least one UE of a second cell.

27. The apparatus of claim 15, wherein the instructions to perform the cross-link interference measurement procedure are further executable by the processor to cause the apparatus to:
   assume that a location from the location information corresponds to a physical location transmitting a corresponding reference signal.

28. The apparatus of claim 15, wherein the location information includes a location of a second access network entity of a second cell, or a physical location of a UE from the second cell, or an estimated location of a UE from the second cell, or a combination thereof.

29. An apparatus for wireless communications at a first user equipment (UE) of a first cell, comprising:
   means for transmitting, to a first access network entity, a request for a set of cross-link interference measurement configurations and location information;
   means for receiving, from the first access network entity, the set of cross-link interference measurement configurations associated with the location information in response to the request;
   means for performing a cross-link interference measurement procedure on signals received based at least in part on the set of cross-link interference measurement configurations, or the location information, or a location of the first UE, or a combination thereof; and
   means for transmitting, to the first access network entity, a measurement value based at least in part on the performed cross-link interference measurement procedure.

30. A non-transitory computer-readable medium storing code for wireless communications at a first user equipment (UE) of a first cell, the code comprising instructions executable by a processor to:
   transmit, to a first access network entity, a request for a set of cross-link interference measurement configurations and location information;
   receive, from the first access network entity, the set of cross-link interference measurement configurations associated with the location information in response to the request;
   perform a cross-link interference measurement procedure on signals received based at least in part on the set of cross-link interference measurement configurations, or the location information, or a location of the first UE, or a combination thereof; and
   transmit, to the first access network entity, a measurement value based at least in part on the performed cross-link interference measurement procedure.

* * * * *